United States Patent
Akiyoshi et al.

(10) Patent No.: US 7,035,452 B2
(45) Date of Patent: Apr. 25, 2006

(54) METHOD AND APPARATUS FOR MULTIVARIATE SPACE PROCESSING

(75) Inventors: Kozo Akiyoshi, Tokyo (JP); Nobuo Akiyoshi, Tokyo (JP)

(73) Assignee: Monolith Co. Ltd., Tokyo (JP)

( * ) Notice: Subject to any disclaimer, the term of this patent is extended or adjusted under 35 U.S.C. 154(b) by 729 days.

(21) Appl. No.: 10/076,492

(22) Filed: Feb. 19, 2002

(65) Prior Publication Data
US 2002/0154821 A1  Oct. 24, 2002

(30) Foreign Application Priority Data
Feb. 16, 2001 (JP) .............................. 2001-039597

(51) Int. Cl.
*G06K 9/00* (2006.01)
(52) U.S. Cl. ...................... 382/154; 382/209; 382/300; 345/419
(58) Field of Classification Search ................ 382/154, 382/195, 205, 206, 209, 217, 218, 219, 236, 382/260, 278, 298, 299, 300
See application file for complete search history.

(56) References Cited

U.S. PATENT DOCUMENTS 4,998,286 A * 3/1991 Tsujiuchi et al. ........... 382/165

(Continued)

FOREIGN PATENT DOCUMENTS

| JP | 06-309139 | 11/1994 |
| JP | 10-079042 | 3/1998 |
| JP | 10-269355 | 10/1998 |

OTHER PUBLICATIONS

Akunova et al. "Degeneration of complex systems under multifrequent input signal." Jul. 5–7, 2000, 2nd International Conference on Control of Oscillations and Chaos, vol.: 1, pp. 101–104.*
Japan Patent Office, Notification of Reason(s) for Refusal, May 10, 2005, 3 pages.
Patent Abstracts of Japan, Publication No. 06-309139, Nov. 4, 1994, International Business Mach Corp (IBM), Japan Patent Office, Japan.
Patent Abstracts of Japan, Publication No. 10-079042, Mar. 24, 1998, Monorisu:KK., Japan Patent Office, Japan.
Patent Abstracts of Japan, Publication No. 10-269355, Oct. 9, 1998, Monorisu:KK., Japan Patent Office, Japan.

*Primary Examiner*—Samir Ahmed
*Assistant Examiner*—Charles Kim

(57) ABSTRACT

A multivariate space processing apparatus and method in which visualization is carried out by image processing alone and without a modeling process. In the apparatus, a preprocessing unit degenerates multivariate data into three variates; a conversion unit specifies a reference variate among the three variates, then determines values for the two remaining variates at two predetermined values of the reference variate, so that a first image and a second image based on the two remaining variates and corresponding to the two predetermined values are generated; a matching processor computes a matching between the first image and the second image; and an intermediate image generator generates an intermediate image of the first and second images based on the matching. Preferably, a display control unit displays the intermediate image on a display.

9 Claims, 22 Drawing Sheets

U.S. PATENT DOCUMENTS

| | | | |
|---|---|---|---|
| 5,275,164 A * | 1/1994 | Maeda et al. | 600/410 |
| 5,671,344 A * | 9/1997 | Stark | 345/419 |
| 5,986,660 A * | 11/1999 | Sweatt, III | 345/419 |
| 6,018,592 A | 1/2000 | Shinagawa et al. | 382/195 |
| 6,137,910 A | 10/2000 | Shinagawa et al. | 382/195 |
| 6,192,351 B1 * | 2/2001 | Persaud | 706/2 |
| 6,442,445 B1 * | 8/2002 | Bunkofske et al. | 700/108 |
| 6,654,047 B1 * | 11/2003 | Iizaka | 348/143 |

* cited by examiner

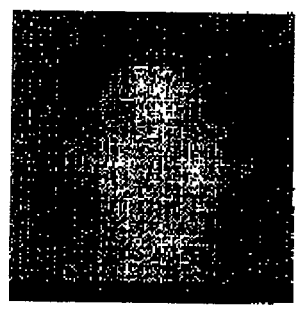
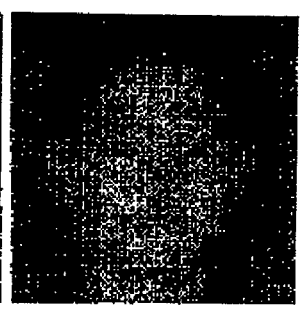
Fig.1a  Fig.1b
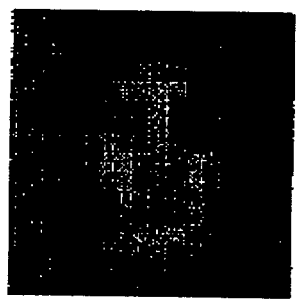
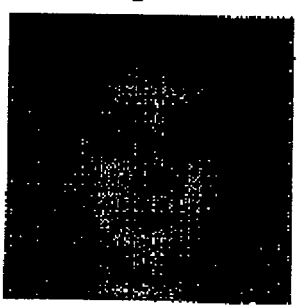
Fig.1c  Fig.1d
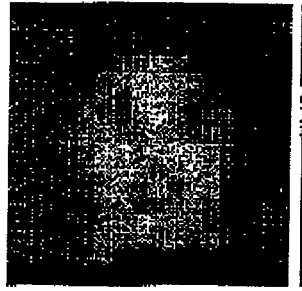
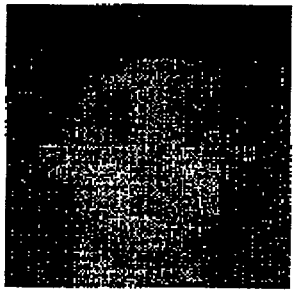
Fig.1e  Fig.1f
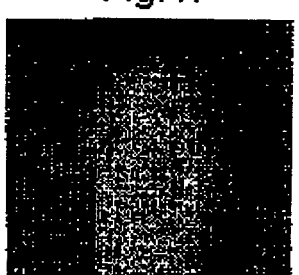
Fig.1g  Fig.1h
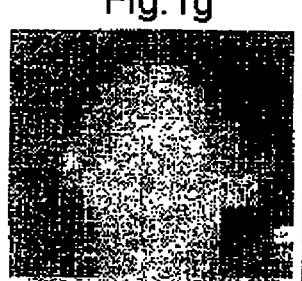
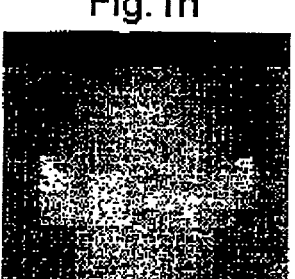
Fig.1i  Fig.1j

Fig. 9

METHOD AND APPARATUS FOR MULTIVARIATE SPACE PROCESSING

BACKGROUND OF THE INVENTION

1. Field of the Invention

The present invention relates to a multivariate space processing technology and multivariate space processing method and apparatus, and more particularly relates to a method and apparatus for predicting, interpolating and displaying multivariate data.

2. Description of the Related Art

Scientific visualization is often used as a tool to allow a user to intuitively grasp or understand complex phenomena and large-scale data. For example, in order to visualize time-varying complex three-dimensional phenomena such as ocean currents or tornados, density and other attributes of each point in the three-dimensional space are assigned for each voxel and time-varied values are computed sequentially and displayed, so that a general structure and motion of the large-scale data can be approximated. Besides grasping a phenomenon as a whole, visualization is also used as a tool to gauge the effectiveness of a hypothetical modeling simulation in a simplified and convenient manner.

In most cases, scientific visualization is implemented to allow a phenomenon or model to be understood in a general and simplified way. However, in actuality, the creation of a scientific visualization will generally involve a series of relatively complex processes such as setting up complex equations and functions, tracing time-varying values of each point in the n-dimensional space, and converting this large amount of data to a display space. Thus, the computational load for even a basic scientific visualization can be quite large, so that, in many cases, the amount of time and effort required to complete the scientific visualization adversely affects the pace at which the overall research processes can be conducted.

SUMMARY OF THE INVENTION

The present invention has been made in view of the foregoing circumstances and an object thereof is to provide a technique by which the time-varying behaviour of three-dimensional objects can be visualized or displayed with a reduced computational load. Another object of the present invention is to provide a technique by which the structure of or changes in a multivariate space having a dimension greater than three can be visualized or displayed in a simple and efficient manner.

Hereinafter, the term "variate" is used to describe each of a plurality of variable quantities in a multivariate space. A variate may also sometimes be called a parameter and these terms may generally be treated in the same manner as the term "dimension" as the case may be. Further, when a variate is referred to as a variate of an object, the variate may also be defined as an attribute of the object.

An embodiment according to the present invention relates to a multivariate space processing method. The multivariate space processing method includes: degenerating multivariate data into three predetermined variates (referred to as, for example, x, y, t hereinafter); determining a reference variate (referred to as, for example, t hereinafter) to serve as a reference among the three variates; acquiring a first two-dimensional space formed by the remaining two variates when the reference variate takes a first value; acquiring a second two-dimensional space formed by the remaining two variates when the reference variate takes a second value; and computing a matching between the first two-dimensional space and the second two-dimensional space.

In particular, the "degenerating" may be such that certain variate(s) or dimension(s) are simply cut off or, in other cases, may be such that a specific value is assumed for certain variate(s) or dimensions. For example, in a case where a three-dimensional space is degenerated to a two-dimensional space, the variate of height may be set to some constant (z=const.). Here, it suffices that the degeneration is such that an n dimension space is degenerated to a dimension which is less than n. For example, a three-dimensional space may simply be converted to an arbitrary plane $ax+by+cz+d=0$. Moreover, a three-dimensional space may be converted to a curved surface such as $ax^2+by+c=0$. In any event, reducing the number of variates is called degeneration.

As an example, consider the case where the reference variate t is time. Now, the remaining two variates x and y can be used to define a first two-dimensional space, sometimes called the first image, at time $t=t0$ and a second two-dimensional space, sometimes called the second image, at time $t=t1$. If an image matching is computed between the first and second images, the approximate behavior of the two variates x and y in the region $t=[t0, t1]$ can be determined. In this case, it suffices to compute a matching between the two-dimensional images, and the computational load can be reduced by selecting a suitable algorithm. The "base technology" described later provides one such suitable algorithm and contributes to producing a suitable visualization.

With this embodiment, a complicated multivariate space or object can be converted into a simple model by selecting three variates. As an example, consider that there are a large number of factors (variates) that go into determining a stock price. Initially, three variates of the stock price are tentatively determined based on a rule of thumb or an arbitrary selection after a search algorithm has enumerated a number of possible variates. Next, a first image and a second image are generated and an intermediate image thereof at, for example, $t=t2$ is generated by matching and interpolation. Thereafter, this intermediate image (also referred to as a virtual intermediate image hereinafter) and the actual stock price at the time $t=t2$ (also referred to as an authentic intermediate image) are compared to determine the suitability of the selection of the three variates. Thus, if the virtual intermediate image is close to the authentic intermediate image, it is concluded that the three variates have high importance. This can be used or further tested by determining if it is possible to analyze or predict the stock price at another time by using these three variates. Further, the virtual intermediate image and the authentic intermediate image may also be compared while the three variates are being changed, while the selection of the variate serving as the reference (also referred to as the reference variate) is being changed, and/or while the value of the reference variate is being changed.

By adopting the above-described methods while reducing the number of parameters to three, a stock price model can be simultaneously simplified and optimized. The methods may be stated from a more general perspective as: viewing a multidimensional phenomenon or object from various angles while reducing parameters one at a time, conducting an inspection to find an angle at which a most characteristic image is obtained, and repeating a degeneration to view the object at that particular angle. Using a simple example, consider a case where a three-dimensional object is projected as a "shadow picture" on a plane. There will generally be an angle at which the original object can be relatively easily grasped or understood from the shadow picture. A projection operation using this angle corresponds to the degeneration.

The above-described matching may be performed by regarding the first two-dimensional space and second two-dimensional space as a first image and a second image, respectively, and computing pixel by pixel based on correspondence between a critical point detected through a two-dimensional search on the first image and a critical point detected through a two-dimensional search on the second image.

The matching may further include: multiresolutionalizing the first image and the second image by respectively extracting the critical points; performing a pixel-by-pixel matching computation on the first image and the second image at the same multiresolution level; and acquiring a pixel-by-pixel correspondence relation at a finer level of resolution while inheriting a result of the pixel-by-pixel matching computation from a matching computation at a different multiresolution level.

Another preferred embodiment according to the present invention relates also to a multivariate space processing method that includes: acquiring a first image and a second image by projecting three-dimensional data on a predetermined plane; and computing a matching between the first image and the second image. By implementing this method, after the three-dimensional data of, for example, a tornado are projected on a two-dimensional plane to create the first and second images, intermediate states in a region of time t=[t0, t1] can be visualized by interpolating the two-dimensional images for time t=t0 and time t=t1. Computationally, once the matching is completed, there will not be much time needed for the interpolation. Moreover, since the interpolation can be performed at any point in the region by arbitrarily varying the time t, the computational load becomes extremely low compared to conventional visualization, in which a three-dimensional computation is performed sequentially. Thus, this embodiment is effective particularly when one wants to quickly visualize a phenomenon or simulation in as simplified and convenient a manner as possible.

Still another embodiment according to the present invention relates to a multivariate space processing apparatus that includes: a preprocessing unit which degenerates multivariate data into three predetermined variates; a conversion unit which determines a reference variate from among the three variates to serve as a reference, acquires, as a first image, a two-dimensional space formed by the remaining two variates when the reference variate takes a first value, and acquires, as a second image, a two-dimensional space formed by the remaining two variates when the reference variate takes a second value; and a matching processor which computes a matching between the first image and the second image. In this embodiment, the apparatus may further include an intermediate image generator which generates an intermediate image of the first image and the second image by performing an interpolation computation based on a result of the matching computation.

Still another embodiment according to the present invention relates also to a multivariate space processing apparatus that includes: a conversion unit which acquires a first image and a second image by projecting three-dimensional data on a predetermined plane; and a matching processor which computes a matching between the first image and the second image.

In the embodiments herein, the matching and, in particular, the matching using critical points may be an application of the techniques (referred to as the "base technology" hereinafter) proposed in Japanese Patent No.2927350 owned by the same assignee of the present patent application.

It is to be noted that the base technology is not a prerequisite in the present invention. Moreover, it is also possible to have replacement or substitution of the above-described components, elements, functions or processes in part or whole as between method and apparatus or to add components, elements, functions or processes to method or apparatus, and it will also be understood that the components, elements, functions or processes may be implemented by a computer program and saved on a recording medium or the like and are all effective as and encompassed by the present invention.

Moreover, this summary of the invention does not necessarily describe all necessary features so that the invention may also be sub-combination of these described features.

BRIEF DESCRIPTION OF THE DRAWINGS

FIG. 1(a) is an image obtained as a result of the application of an averaging filter to a human facial image.

FIG. 1(b) is an image obtained as a result of the application of an averaging filter to another human facial image.

FIG. 1(c) is an image of a human face at $p^{(5,0)}$ obtained in a preferred embodiment in the base technology.

FIG. 1(d) is another image of a human face at $p^{(5,0)}$ obtained in a preferred embodiment in the base technology.

FIG. 1(e) is an image of a human face at $p^{(5,1)}$ obtained in a preferred embodiment in the base technology.

FIG. 1(f) is another image of a human face at $p^{(5,1)}$ obtained in a preferred embodiment in the base technology.

FIG. 1(g) is an image of a human face at $p^{(5,2)}$ obtained in a preferred embodiment in the base technology.

FIG. 1(h) is another image of a human face at $p^{(5,2)}$ obtained in a preferred embodiment in the base technology.

FIG. 1(i) is an image of a human face at $p^{(5,3)}$ obtained in a preferred embodiment in the base technology.

FIG. 1(j) is another image of a human face at $p^{(5,3)}$ obtained in a preferred embodiment in the base technology.

FIG. 9 is a diagram showing correspondence between partial images of the m-th and (m−1)th levels of resolution.

DETAILED DESCRIPTION OF THE INVENTION

Figure 2R:
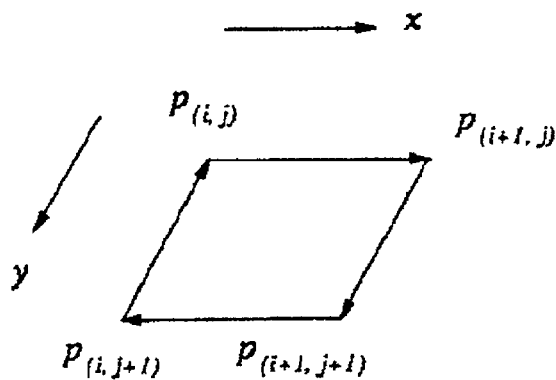
FIG. 2(R) shows an original quadrilateral.
Figure 2A:
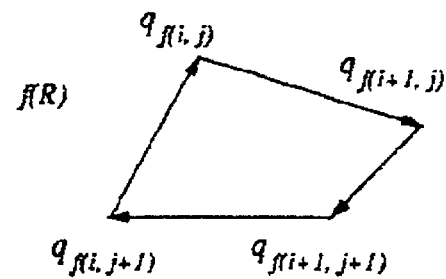
FIG. 2(A) shows an inherited quadrilateral.
Figure 2E:
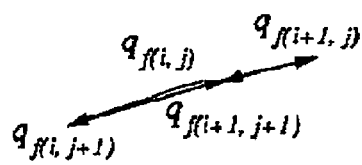
FIG. 2(E) shows an inherited quadrilateral.
Figure 2B:
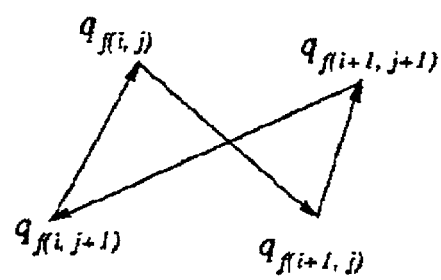
FIG. 2(B) shows an inherited quadrilateral.
Figure 2D:
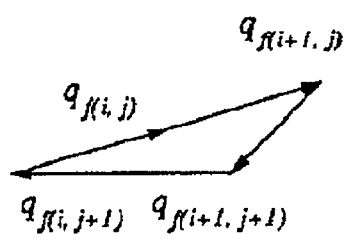
FIG. 2(D) shows an inherited quadrilateral.
Figure 2C:
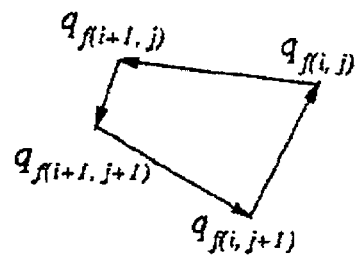
FIG. 2(C) shows an inherited quadrilateral.

The invention will now be described based on the preferred embodiments, which are not intended to limit the scope but to exemplify the present invention. All of the features and the combinations thereof described in the embodiments are not necessarily essential to the invention.

First, the multiresolutional critical point filter technology and the image matching processing using the technology, both of which will be utilized in the preferred embodiments, will be described in detail as "Base Technology". Namely, the following sections [1] and [2] (below) belong to the base technology, where section [1] describes elemental techniques and section [2] describes a processing procedure. These techniques are patented under Japanese Patent No. 2927350 and owned by the same assignee of the present invention. As described in more detail below following the discussion of the base technology, according to the embodiments of the present invention there is provided a mesh on an image, so that lattice points of the mesh represent a plurality of pixels of the image. Thus, even though application efficiency for a pixel-by-pixel matching technique as described in the base technology is naturally high, it is to be noted that the image matching techniques provided in the present embodiments are not limited to the same levels.

After discussing the base technology, there is a description, related to FIGS. 18 to 23, of image data coding and decoding techniques for multivariate space processing according to embodiments of the present invention and utilizing the base technology.

Base Technology

[1] Detailed Description of Elemental Techniques

[1.1] Introduction

Using a set of new multiresolutional filters called critical point filters, image matching is accurately computed. There is no need for any prior knowledge concerning the content of the images or objects in question. The matching of the images is computed at each resolution while proceeding through the resolution hierarchy. The resolution hierarchy proceeds from a coarse level to a fine level. Parameters necessary for the computation are set completely automatically by dynamical computation analogous to human visual systems. Thus, There is no need to manually specify the correspondence of points between the images.

The base technology can be applied to, for instance, completely automated morphing, object recognition, stereo photogrammetry, volume rendering, and smooth generation of motion images from a small number of frames. When applied to morphing, given images can be automatically transformed. When applied to volume rendering, intermediate images between cross sections can be accurately reconstructed, even when a distance between cross sections is rather large and the cross sections vary widely in shape.

[1.2] The Hierarchy of the Critical Point Filters

The multiresolutional filters according to the base technology preserve the intensity and location of each critical point included in the images while reducing the resolution. Initially, let the width of an image to be examined be N and the height of the image be M. For simplicity, assume that $N=M=2^n$ where n is a positive integer. An interval $[0, N] \subset R$ is denoted by I. A pixel of the image at position (i, j) is denoted by $p^{(i,j)}$ where i,j∈I.

Here, a multiresolutional hierarchy is introduced. Hierarchized image groups are produced by a multiresolutional filter. The multiresolutional filter carries out a two dimensional search on an original image and detects critical points therefrom. The multiresolutinal filter then extracts the critical points from the original image to construct another image having a lower resolution. Here, the size of each of the respective images of the m-th level is denoted as $2^m \times 2^m$ (0<m<n). A critical point filter constructs the following four new hierarchical images recursively, in the direction descending from n.

$$p_{(i,j)}^{(m,0)} = \min(\min(p_{(2i,2j)}^{(m+1,0)}, p_{(2i,2j+1)}^{(m+1,0)}), \min(p_{(2i+1,2j)}^{(m+1,0)}, p_{(2i+1,2j+1)}^{(m+1,0)})) \quad (1)$$

$$p_{(i,j)}^{(m,1)} = \max(\min(p_{(2i,2j)}^{(m+1,1)}, p_{(2i,2j+1)}^{(m+1,1)}), \min(p_{(2i+1,2j)}^{(m+1,1)}, p_{(2i+1,2j+1)}^{(m+1,1)}))$$

$$p_{(i,j)}^{(m,2)} = \min(\max(p_{(2i,2j)}^{(m+1,2)}, p_{(2i,2j+1)}^{(m+1,2)}), \max(p_{(2i+1,2j)}^{(m+1,2)}, p_{(2i+1,2j+1)}^{(m+1,2)}))$$

$$p_{(i,j)}^{(m,3)} = \max(\max(p_{(2i,2j)}^{(m+1,3)}, p_{(2i,2j+1)}^{(m+1,3)}), \max(p_{(2i+1,2j)}^{(m+1,3)}, p_{(2i+1,2j+1)}^{(m+1,3)}))$$

where we let $$p_{(i,j)}^{(n,0)} = p_{(i,j)}^{(n,1)} = p_{(i,j)}^{(n,2)} = p_{(i,j)}^{(n,3)} = p_{(i,j)} \quad (2)$$

The above four images are referred to as subimages hereinafter. When $\min_{x \leq t \leq x+1}$ and $\max_{x \leq t \leq x+1}$ are abbreviated to α and β, respectively, the subimages can be expressed as follows:

$$p^{(m,0)} = \alpha(x)\alpha(y)p^{(m+1,0)}$$

$$p^{(m,1)} = \alpha(x)\beta(y)p^{(m+1,1)}$$

$$p^{(m,2)} = \beta(x)\alpha(y)p^{(m+1,2)}$$

$$p^{(m,2)} = \beta(x)\beta(y)p^{(m+1,3)}$$

Namely, they can be considered analogous to the tensor products of α and β. The subimages correspond to the respective critical points. As is apparent from the above equations, the critical point filter detects a critical point of the original image for every block consisting of 2×2 pixels. In this detection, a point having a maximum pixel value and a point having a minimum pixel value are searched with respect to two directions, namely, vertical and horizontal directions, in each block. Although pixel intensity is used as a pixel value in this base technology, various other values relating to the image may be used. A pixel having the maximum pixel values for the two directions, one having minimum pixel values for the two directions, and one having a minimum pixel value for one direction and a maximum pixel value for the other direction are detected as a local maximum point, a local minimum point, and a saddle point, respectively.

By using the critical point filter, an image (1 pixel here) of a critical point detected inside each of the respective blocks serves to represent its block image (4 pixels here) in the next lower resolution level. Thus, the resolution of the image is reduced. From a singularity theoretical point of view, $\alpha(x)\alpha(y)$ preserves the local minimum point (minima point), $\beta(x)\beta(y)$ preserves the local maximum point (maxima point), $\alpha(x)\beta(y)$ and $\beta(x)\alpha(y)$ preserve the saddle points.

At the beginning, a critical point filtering process is applied separately to a source image and a destination image which are to be matching-computed. Thus, a series of image groups, namely, source hierarchical images and destination hierarchical images are generated. Four source hierarchical images and four destination hierarchical images are generated corresponding to the types of the critical points.

Thereafter, the source hierarchical images and the destination hierarchical images are matched in a series of resolution levels. First, the minima points are matched using $p^{(m,0)}$. Next, the first saddle points are matched using $p^{(m,1)}$ based on the previous matching result for the minima points. The second saddle points are matched using $p^{(m,2)}$. Finally, the maxima points are matched using $p^{(m,3)}$.

FIGS. 1c and 1d show the subimages $p^{(5,0)}$ of the images in FIGS. 1a and 1b, respectively. Similarly, FIGS. 1e and 1f show the subimages $p^{(5,1)}$, FIGS. 1g and 1h show the subimages $p^{(5,2)}$, and FIGS. 1i and 1j show the subimages $p^{(5,3)}$. Characteristic parts in the images can be easily matched using subimages. The eyes can be matched by $p^{(5,0)}$ since the eyes are the minima points of pixel intensity in a face. The mouths can be matched by $p^{(5,1)}$ since the mouths have low intensity in the horizontal direction. Vertical lines on both sides of the necks become clear by $p^{(5,2)}$. The ears and bright parts of the cheeks become clear by $p^{(5,3)}$ since these are the maxima points of pixel intensity.

As described above, the characteristics of an image can be extracted by the critical point filter. Thus, by comparing, for example, the characteristics of an image shot by a camera with the characteristics of several objects recorded in advance, an object shot by the camera can be identified.

[1.3] Computation of Mapping Between Images

Now, for matching images, a pixel of the source image at the location (i,j) is denoted by $p_{(i,j)}^{(n)}$ and that of the destination image at (k,l) is denoted by $q_{(k,l)}^{(n)}$ where i, j, k, l∈I. The energy of the mapping between the images (described later in more detail) is then defined. This energy is determined by the difference in the intensity of the pixel of the source image and its corresponding pixel of the destination image and the smoothness of the mapping. First, the mapping $f^{(m,0)}:p^{(m,0)} \rightarrow q^{(m,0)}$ between $p^{(m,0)}$ and $q^{(m,0)}$ with the minimum energy is computed. Based on $f^{(m,0)}$, the mapping $f^{(m,1)}$ between $p^{(m,1)}$ and $q^{(m,1)}$ with the minimum energy is computed. This process continues until $f^{(m,3)}$ between $p^{(m,3)}$ and $q^{(m,3)}$ is computed. Each $f^{(m,i)}$ (i=0, 1, 2, ...) is referred to as a submapping. The order of i will be rearranged as shown in the following equation (3) in computing $f^{(m,i)}$ for reasons to be described later.

$$f^{(m,i)}:p^{(m,\sigma(i))} \rightarrow q^{(m,\sigma(i))} \quad (3)$$

where $\sigma(i) \in \{0, 1, 2, 3\}$.

[1.3.1] Bijectivity

When the matching between a source image and a destination image is expressed by means of a mapping, that mapping shall satisfy the Bijectivity Conditions (BC) between the two images (note that a one-to-one surjective mapping is called a bijection). This is because the respective images should be connected satisfying both surjection and injection, and there is no conceptual supremacy existing between these images. It is to be noted that the mappings to be constructed here are the digital version of the bijection. In the base technology, a pixel is specified by a co-ordinate point.

The mapping of the source subimage (a subimage of a source image) to the destination subimage (a subimage of a destination image) is represented by $f^{(m,s)}:I/2^{n-m} \times I/2^{n-m} \rightarrow I/2^{n-m} \times I/2^{n-m}$ (s=0, 1, ...), where $f_{(i,j)}^{(m,s)}=(k,l)$ means that $p_{(i,j)}^{(m,s)}$ of the source image is mapped to $q_{(k,l)}^{(m,s)}$ of the destination image. For simplicity, when f(i,j)=(k,l) holds, a pixel $q_{(k,l)}$ is denoted by $q_{f(i,j)}$.

When the data sets are discrete as image pixels (grid points) treated in the base technology, the definition of bijectivity is important. Here, the bijection will be defined in the following manner, where i, j, k and l are all integers. First, a square region R defined on the source image plane is considered $$p_{(i,j)}^{(m,s)} p_{(i+1,j)}^{(m,s)} p_{(i+1,j+1)}^{(m,s)} p_{(i,j+1)}^{(m,s)} \quad (4)$$

where i=0, ..., $2^m-1$, and j=0, ..., $2^m-1$. The edges of R are directed as follows:

$$\overrightarrow{p_{(i,j)}^{(m,s)} p_{(i+1,j)}^{(m,s)}}, \overrightarrow{p_{(i+1,j)}^{(m,s)} p_{(i+1,j+1)}^{(m,s)}}, \overrightarrow{p_{(i+1,j+1)}^{(m,s)} p_{(i,j+1)}^{(m,s)}} \text{ and } \overrightarrow{p_{(i,j+1)}^{(m,s)} p_{(i,j)}^{(m,s)}} \quad (5)$$

This square region R will be mapped by f to a quadrilateral on the destination image plane:

$$q_{f(i,j)}^{(m,s)} q_{f(i+1,j)}^{(m,s)} q_{f(i+1,j+1)}^{(m,s)} q_{f(i,j+1)}^{(m,s)} \quad (6)$$

This mapping $f^{(m,s)}(R)$, that is, $$f^{(m,s)}(R) = f^{(m,s)}\left(p_{(i,j)}^{(m,s)} p_{(i+1,j)}^{(m,s)} p_{(i+1,j+1)}^{(m,s)} p_{(i,j+1)}^{(m,s)}\right) = q_{f(i,j)}^{(m,s)} q_{f(i+1,j)}^{(m,s)} q_{f(i+1,j+1)}^{(m,s)} q_{f(i,j+1)}^{(m,s)}$$

should satisfy the following bijectivity conditions (referred to as BC hereinafter):

1. The edges of the quadrilateral $f^{(m,s)}(R)$ should not intersect one another.
2. The orientation of the edges of $f^{(m,s)}(R)$ should be the same as that of R (clockwise in the case shown in FIG. 2, described below).
3. As a relaxed condition, a retraction mapping is allowed.

Without a certain type of a relaxed condition as in, for example, condition 3 above, there would be no mappings which completely satisfy the BC other than a trivial identity mapping. Here, the length of a single edge of $f^{(m,s)}(R)$ may be zero. Namely, $f^{(m,s)}(R)$ may be a triangle. However, $f^{(m,s)}(R)$ is not allowed to be a point or a line segment having area zero. Specifically speaking, if FIG. 2R is the original quadrilateral, FIGS. 2A and 2D satisfy the BC while FIGS. 2B, 2C and 2E do not satisfy the BC.

In actual implementation, the following condition may be further imposed to easily guarantee that the mapping is surjective. Namely, each pixel on the boundary of the source image is mapped to the pixel that occupies the same location at the destination image. In other words, f(i,j)=(i,j) (on the four lines of i=0, i=$2^m$−1, j=0, j=$2^m$−1). This condition will be hereinafter referred to as an additional condition.

[1.3.2] Energy of Mapping

[1.3.2.1] Cost Related to the Pixel Intensity

The energy of the mapping f is defined. An objective here is to search a mapping whose energy becomes minimum. The energy is determined mainly by the difference in the intensity between the pixel of the source image and its corresponding pixel of the destination image. Namely, the energy $C_{(i,j)}^{(m,s)}$ of the mapping $f^{(m,s)}$ at (i,j) is determined by the following equation (7).

$$C_{(i,j)}^{(m,s)} = |V(p_{(i,j)}^{(m,s)}) - V(q_{f(i,j)}^{(m,s)})|^2 \qquad (7)$$

where $V(p_{(i,j)}^{(m,s)})$ and $V(q_{f(i,j)}^{(m,s)})$ are the intensity values of the pixels $p_{(i,j)}^{(m,s)}$ and $q_{f(i,j)}^{(m,s)}$, respectively. The total energy $C^{(m,s)}$ of f is a matching evaluation equation, and can be defined as the sum of $C_{(i,j)}^{(m,s)}$ as shown in the following equation (8).

$$C_f^{(m,s)} = \sum_{i=0}^{i=2^m-1} \sum_{j=0}^{j=2^m-1} C_{(i,j)}^{(m,s)} \qquad (8)$$

[1.3.2.2] Cost Related to the Locations of the Pixel for Smooth Mapping

In order to obtain smooth mappings, another energy $D_f$ for the mapping is introduced. The energy $D_f$ is determined by the locations of $p_{(i,j)}^{(m,s)}$ and $q_{f(i,j)}^{(m,s)}$ (i=0, 1, ..., $2^m$−1), regardless of the intensity of the pixels. The energy $D_{(i,j)}^{(m,s)}$ of the mapping $f^{(m,s)}$ at a point (i,j) is determined by the following equation (9).

$$D_{(i,j)}^{(m,s)} = \eta E_{0(i,j)}^{(m,s)} + E_{1(i,j)}^{(m,s)} \qquad (9)$$

where the coefficient parameter η which is equal to or greater than 0 is a real number. And we have $$E_{0(i,j)}^{(m,s)} = \|(i,j) - f^{(m,s)}(i,j)\|^2 \qquad (10)$$

$$E_{1(i,j)}^{(m,s)} = \sum_{i'=i-1}^{i} \sum_{j'=j-1}^{j} \|(f^{(m,s)}(i,j) - (i,j)) - (f^{(m,s)}(i',j') - (i',j'))\|^2 / 4 \qquad (11)$$

where $$\|(x,y)\| = \sqrt{x^2 + y^2}, \qquad (12)$$

i' and j' are integers and f(i',j') is defined to be zero for i'<0 and j'<0. $E_0$ is determined by the distance between (i,j) and f(i,j). $E_0$ prevents a pixel from being mapped to a pixel too far away from it. However, as explained below, $E_0$ can be replaced by another energy function. $E_1$ ensures the smoothness of the mapping. $E_1$ represents a distance between the displacement of p(i,j) and the displacement of its neighboring points. Based on the above consideration, another evaluation equation for evaluating the matching, or the energy $D_f$ is determined by the following equation:

$$D_f^{(m,s)} = \sum_{i=0}^{i=2^m-1} \sum_{j=0}^{j=2^m-1} D_{(i,j)}^{(m,s)} \qquad (13)$$

[1.3.2.3] Total Energy of the Mapping

The total energy of the mapping, that is, a combined evaluation equation which relates to the combination of a plurality of evaluations, is defined as $\lambda C_f^{(m,s)} + D_f^{(m,s)}$, where $\lambda \geq 0$ is a real number. The goal is to detect a state in which the combined evaluation equation has an extreme value, namely, to find a mapping which gives the minimum energy expressed by the following:

$$\min_f \{\lambda C_f^{(m,s)} + D_f^{(m,s)}\} \qquad (14)$$

Care must be exercised in that the mapping becomes an identity mapping if λ=0 and η=0 (i.e., $f^{(m,s)}(i,j)=(i,j)$ for all i=0, 1, ..., $2^m$−1 and j=0, 1, ..., $2^m$−1). As will be described later, the mapping can be gradually modified or transformed from an identity mapping since the case of λ=0 and η=0 is evaluated at the outset in the base technology. If the combined evaluation equation is defined as $C_f^{(m,s)} + \lambda D_f^{(m,s)}$ where the original position of λ is changed as such, the equation with λ=0 and η=0 will be $C_f^{(m,s)}$ only. As a result thereof, pixels would randomly matched to each other only because their pixel intensities are close, thus making the mapping totally meaningless. Transforming the mapping based on such a meaningless mapping makes no sense. Thus, the coefficient parameter is so determined that the identity mapping is initially selected for the evaluation as the best mapping.

Similar to this base technology, differences in the pixel intensity and smoothness are considered in a technique called "optical flow" that is known in the art. However, the optical flow technique cannot be used for image transformation since the optical flow technique takes into account only the local movement of an object. However, global correspondence can also be detected by utilizing the critical point filter according to the base technology.

[1.3.3] Determining the Mapping with Multi-resolution

A mapping $f_{min}$ which gives the minimum energy and satisfies the BC is searched by using the multiresolution hierarchy. The mapping between the source subimage and the destination subimage at each level of the resolution is computed. Starting from the top of the resolution hierarchy (i.e., the coarsest level), the mapping is determined at each resolution level, and where possible, mappings at other levels are considered. The number of candidate mappings at each level is restricted by using the mappings at an upper (i.e., coarser) level of the hierarchy. More specifically speaking, in the course of determining a mapping at a certain level, the mapping obtained at the coarser level by one is imposed as a sort of constraint condition.

We thus define a parent and child relationship between resolution levels. When the following equation (15) holds, $$(i', j') = \left( \left\lfloor \frac{i}{2} \right\rfloor, \left\lfloor \frac{j}{2} \right\rfloor \right), \tag{15}$$

where $\lfloor x \rfloor$ denotes the largest integer not exceeding x, $p_{(i',j')}^{(m-1,s)}$ and $q_{(i',j')}^{(m-1,s)}$ are respectively called the parents of $p_{(i,j)}^{(m,s)}$ and $q_{(i,j)}^{(m,s)}$,. Conversely, $p_{(i,j)}^{(m,s)}$ and $q_{(i,j)}^{(m,s)}$ are the child of $p_{(i',j')}^{(m-1,s)}$ and the child of $q_{(i',j')}^{(m-1,s)}$, respectively. A function parent(i,j) is defined by the following equation (16):

$$\text{parent}(i, j) = \left( \left\lfloor \frac{i}{2} \right\rfloor, \left\lfloor \frac{j}{2} \right\rfloor \right) \tag{16}$$

Now, a mapping between $p_{(i,j)}^{(m,s)}$ and $q_{(k,l)}^{(m,s)}$ is determined by computing the energy and finding the minimum thereof. The value of $f^{(m,s)}(i,j)=(k,l)$ is determined as follows using f(m−1,s) (m=1, 2, . . . , n). First of all, a condition is imposed that $q_{(k,l)}^{(m,s)}$ should lie inside a quadrilateral defined by the following definitions (17) and (18). Then, the applicable mappings are narrowed down by selecting ones that are thought to be reasonable or natural among them satisfying the BC.

$$q_{g^{(m,s)}(i-1,j-1)}^{(m,s)} q_{g^{(m,s)}(i-1,j+1)}^{(m,s)} q_{g^{(m,s)}(i+1,j+1)}^{(m,s)} q_{g^{(m,s)}(i+1,j-1)}^{(m,s)} \tag{17}$$

where $$g^{(m,s)}(i,j)=f^{(m-1,s)}(\text{parent}(i,j))+f^{(m-1,s)}(\text{parent}(i,j)+(1,1)) \tag{18}$$

The quadrilateral defined above is hereinafter referred to as the inherited quadrilateral of $p_{(i,j)}^{(m,s)}$. The pixel minimizing the energy is sought and obtained inside the inherited quadrilateral.

Figure 3:
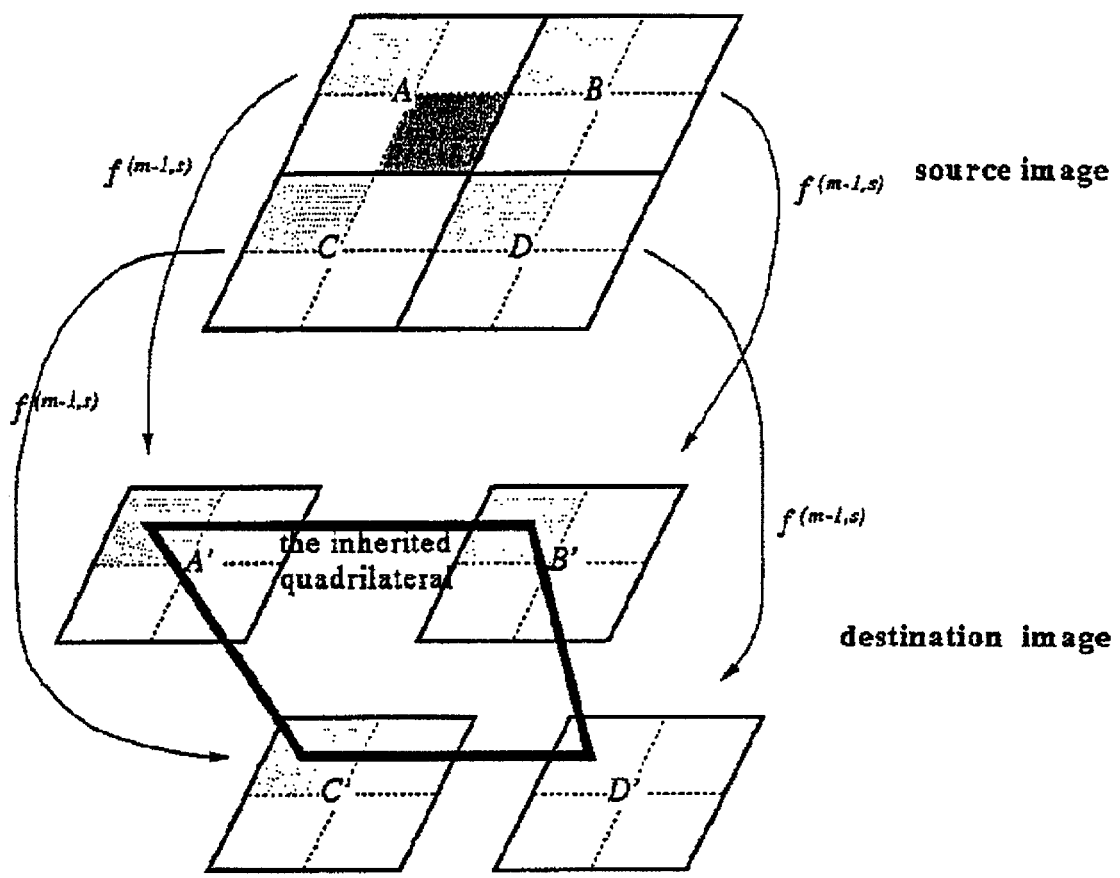
FIG. 3 is a diagram showing the relationship between a source image and a destination image and that between the m-th level and the (m−1)th level, using a quadrilateral.

FIG. 3 illustrates the above-described procedures. The pixels A, B, C and D of the source image are mapped to A', B', C' and D' of the destination image, respectively, at the (m−1)th level in the hierarchy. The pixel $p_{(i,j)}^{(m,s)}$ should be mapped to the pixel $q_{f^{(m)}(i,j)}^{(m,s)}$ which exists inside the inherited quadrilateral A'B'C'D'. Thereby, bridging from the mapping at the (m−1)th level to the mapping at the m-th level is achieved.

The energy $E_0$ defined above may now be replaced by the following equations (19) and (20):

$$E_{0(i,j)} = \|f^{(m,0)}(i, j) - g^{(m)}(i, j)\|^2 \tag{19}$$

$$E_{0(i,j)} = \|f^{(m,s)}(i, j) - g^{(m,s-1)}(i, j)\|^2, (1 \le i) \tag{20}$$

for computing the submapping $f^{(m,0)}$ and the submapping $f^{(m,s)}$ at the m-th level, respectively.

In this manner, a mapping which maintains a low energy of all the submappings is obtained. Using the equation (20) makes the submappings corresponding to the different critical points associated to each other within the same level in order that the subimages can have high similarity. The equation (19) represents the distance between $f^{(m,s)}(i,j)$ and the location where (i,j) should be mapped when regarded as a part of a pixel at the (m−1)the level.

When there is no pixel satisfying the BC inside the inherited quadrilateral A'B'C'D', the following steps are taken. First, pixels whose distance from the boundary of A'B'C'D' is L (at first, L=1) are examined. If a pixel whose energy is the minimum among them satisfies the BC, then this pixel will be selected as a value of $f^{(m,s)}(i,j)$. L is increased until such a pixel is found or L reaches its upper bound $L_{max}^{(m)}$. $L_{max}^{(m)}$ is fixed for each level m. If no pixel is found at all, the third condition of the BC is ignored temporarily and such mappings that caused the area of the transformed quadrilateral to become zero (a point or a line) will be permitted so as to determine $f^{(m,s)}(i,j)$. If such a pixel is still not found, then the first and the second conditions of the BC will be removed.

Multiresolution approximation is essential to determining the global correspondence of the images while preventing the mapping from being affected by small details of the images. Without the multiresolution approximation, it is impossible to detect a correspondence between pixels whose distances are large. In the case where the multiresolution approximation is not available, the size of an image will generally be limited to a very small size, and only tiny changes in the images can be handled. Moreover, imposing smoothness on the mapping usually makes it difficult to find the correspondence of such pixels. That is because the energy of the mapping from one pixel to another pixel which is far therefrom is high. On the other hand, the multiresolution approximation enables finding the approximate correspondence of such pixels. This is because the distance between the pixels is small at the upper (coarser) level of the hierarchy of the resolution.

[1.4] Automatic Determination of the Optimal Parameter Values

One of the main deficiencies of the existing image matching techniques lies in the difficulty of parameter adjustment.

In most cases, the parameter adjustment is performed manually and it is extremely difficult to select the optimal value. However, according to the base technology, the optimal parameter values can be obtained completely automatically.

The systems according to this base technology include two parameters, namely, $\lambda$ and $\eta$, where $\lambda$ and $\eta$ represent the weight of the difference of the pixel intensity and the stiffness of the mapping, respectively. In order to automatically determine these parameters, the are initially set to 0. First, $\lambda$ is gradually increased from $\lambda=0$ while $\eta$ is fixed at 0. As $\lambda$ becomes larger and the value of the combined evaluation equation (equation (14)) is minimized, the value of $C_f^{(m,s)}$ for each submapping generally becomes smaller. This basically means that the two images are matched better. However, if $\lambda$ exceeds the optimal value, the following phenomena occur:

1. Pixels which should not be corresponded are erroneously corresponded only because their intensities are close.
2. As a result, correspondence between images becomes inaccurate, and the mapping becomes invalid.
3. As a result, $D_f^{(m,s)}$ in equation (14) tends to increase abruptly.
4. As a result, since the value of equation (14) tends to increase abruptly, $f^{(m,s)}$ changes in order to suppress the abrupt increase of $D_f^{(m,s)}$. As a result, $C_f^{(m,s)}$ increases.

Therefore, a threshold value at which $C_f^{(m,s)}$ turns to an increase from a decrease is detected while a state in which equation (14) takes the minimum value with $\lambda$ being increased is kept. Such $\lambda$ is determined as the optimal value at $\eta=0$. Next, the behavior of $C_f^{(m,s)}$ is examined while $\eta$ is increased gradually, and $\eta$ will be automatically determined by a method described later. $\lambda$ will then again be determined corresponding to such an automatically determined $\eta$.

The above-described method resembles the focusing mechanism of human visual systems. In the human visual systems, the images of the respective right eye and left eye are matched while moving one eye. When the objects are clearly recognized, the moving eye is fixed.

[1.4.1] Dynamic Determination of $\lambda$

Initially, $\lambda$ is increased from 0 at a certain interval, and a subimage is evaluated each time the value of $\lambda$ changes. As shown in equation (14), the total energy is defined by $\lambda C_f^{(m,s)} + D_f^{(m,s)}$. $D_{(i,j)}^{(m,s)}$ in equation (9) represents the smoothness and theoretically becomes minimum when it is the identity mapping. $E_0$ and $E_1$ increase as the mapping is further distorted. Since $E_1$ is an integer, 1 is the smallest step of $D_f^{(m,s)}$. Thus, it is impossible to change the mapping to reduce the total energy unless a changed amount (reduction amount) of the current $\lambda C_{(i,j)}^{(m,s)}$ is equal to or greater than 1. Since $D_f^{(m,s)}$ increases by more than 1 accompanied by the change of the mapping, the total energy is not reduced unless $\lambda C_{(i,j)}^{(m,s)}$ is reduced by more than 1.

Under this condition, it is shown that $C_{(i,j)}^{(m,s)}$ decreases in normal cases as $\lambda$ increases. The histogram of $C_{(i,j)}^{(m,s)}$ is denoted as $h(l)$, where $h(l)$ is the number of pixels whose energy $C_{(i,j)}^{(m,s)}$ is $l^2$. In order that $\lambda l^2 \geq 1$, for example, the case of $l^2=1/\lambda$ is considered. When $\lambda$ varies from $\lambda_1$ to $\lambda_2$, a number of pixels (denoted A) expressed by the following equation (21):

$$A = \sum_{l=\lceil \frac{1}{\lambda_2} \rceil}^{\lfloor \frac{1}{\lambda_1} \rfloor} h(l) \cong \int_{l=\frac{1}{\lambda_2}}^{\frac{1}{\lambda_1}} h(l)\,dl = -\int_{\lambda_2}^{\lambda_1} h(l)\frac{1}{\lambda^{3/2}}d\lambda = \int_{\lambda_1}^{\lambda_2} \frac{h(l)}{\lambda^{3/2}}d\lambda \qquad (21)$$

changes to a more stable state having the energy shown in equation (22):

$$C_f^{(m,s)} - l^2 = C_f^{(m,s)} - \frac{1}{\lambda}. \qquad (22)$$

Here, it is assumed that the energy of these pixels is approximated to be zero. This means that the value of $C^{(i,j)(m,s)}$ changes by:

$$\partial C_f^{(m,s)} = -\frac{A}{\lambda} \qquad (23)$$

As a result, equation (24) holds.

$$\frac{\partial C_f^{(m,s)}}{\partial \lambda} = -\frac{h(l)}{\lambda^{5/2}} \qquad (24)$$

Since $h(l)>0$, $C_f^{(m,s)}$ decreases in the normal case. However, when $\lambda$ exceeds the optimal value, the above phenomenon, that is, an increase in $C_f^{(m,s)}$ occurs. The optimal value of $\lambda$ is determined by detecting this phenomenon.

When $$h(l) = Hl^k = \frac{H}{\lambda^{k/2}} \qquad (25)$$

is assumed, where both $H(H>0)$ and $k$ are constants, the equation (26) holds:

$$\frac{\partial C_f^{(m,s)}}{\partial \lambda} = -\frac{H}{\lambda^{5/2+k/2}} \qquad (26)$$

Then, if $k \neq -3$, the following equation (27) holds:

$$C_f^{(m,s)} = C + \frac{H}{(3/2+k/2)\lambda^{3/2+k/2}} \qquad (27)$$

The equation (27) is a general equation of $C_f^{(m,s)}$. (where C is a constant).

When detecting the optimal value of $\lambda$, the number of pixels violating the BC may be examined for safety. In the course of determining a mapping for each pixel, the probability of violating the BC is assumed as a value $p_0$ here. In this case, since $$\frac{\partial A}{\partial \lambda} = \frac{h(l)}{\lambda^{3/2}} \quad (28)$$

holds, the number of pixels violating the BC increases at a rate of:

$$B_0 = \frac{h(l)p_0}{\lambda^{3/2}} \quad (29)$$

Thus, $$\frac{B_0 \lambda^{3/2}}{p_0 h(l)} = 1 \quad (30)$$

is a constant. If it is assumed that $h(l)=Hl^k$, the following equation (31), for example, $$B_0 \lambda^{3/2+k/2} = p_0 H \quad (31)$$

becomes a constant. However, when $\lambda$ exceeds the optimal value, the above value of equation (31) increases abruptly. By detecting this phenomenon, i.e. whether or not the value of $B_0 \lambda^{3/2+k/2}/2^m$ exceeds an abnormal value $B_{0thres}$, the optimal value of $\lambda$ can be determined. Similarly, whether or not the value of $B_1 \lambda^{3/2+k/2}/2^m$ exceeds an abnormal value $B_{1thres}$ can be used to check for an increasing rate $B_1$ of pixels violating the third condition of the BC. The reason why the factor $2^m$ is introduced here will be described at a later stage. This system is not sensitive to the two threshold values $B_{0thres}$ and $B_{1thres}$. The two threshold values $B_{0thres}$ and $B_{1thres}$ can be used to detect excessive distortion of the mapping which may not be detected through observation of the energy $C_f^{(m,s)}$.

In the experimentation, when $\lambda$ exceeded 0.1 the computation of $f^{(m,s)}$ was stopped and the computation of $f^{(m,s+1)}$ was started. That is because the computation of submappings is affected by a difference of only 3 out of 255 levels in pixel intensity when $\lambda > 0.1$ and it is then difficult to obtain a correct result.

[1.4.2] Histogram h(l)

The examination of $C_f^{(m,s)}$ does not depend on the histogram h(l), however, the examination of the BC and its third condition may be affected by h(l). When $(\lambda, C_f^{(m,s)})$ is actually plotted, k is usually close to 1. In the experiment, k=1 is used, that is, $B_0 \lambda^2$ and $B_1 \lambda^2$ are examined. If the true value of k is less than 1, $B_0 \lambda^2$ and $B_1 \lambda^2$ are not constants and increase gradually by a factor of $\lambda^{(1-k)/2}$. If h(l) is a constant, the factor is, for example, $\lambda^{1/2}$. However, such a difference can be absorbed by setting the threshold $B_{0thres}$ appropriately.

Let us model the source image by a circular object, with its center at $(x_0, y_0)$ and its radius r, given by:

$$p(i, j) = \quad (32)$$

-continued $$\begin{cases} \frac{255}{r} c\left(\sqrt{(i-x_0)^2 + (j-y_0)^2}\right) \dots \left(\sqrt{(i-x_0)^2 + (j-y_0)^2} \le r\right) \\ 0 \dots \text{(otherwise)} \end{cases}$$

and the destination image given by:

$$q(i, j) = \quad (33)$$

$$\begin{cases} \frac{255}{r} c\left(\sqrt{(i-x_1)^2 + (j-y_1)^2}\right) \dots \left(\sqrt{(i-x_1)^2 + (j-y_1)^2} \le r\right) \\ 0 \dots \text{(otherwise)} \end{cases}$$

with its center at $(x_1, y_1)$ and radius r. In the above, let c(x) have the form of $c(x)=x^k$. When the centers $(x_0, y_0)$ and $(x_1, y_1)$ are sufficiently far from each other, the histogram h(l) is then in the form:

$$h(l) \propto rl^k (k \ne 0) \quad (34)$$

When k=1, the images represent objects with clear boundaries embedded in the background. These objects become darker toward their centers and brighter toward their boundaries. When k=−1, the images represent objects with vague boundaries. These objects are brightest at their centers, and become darker toward their boundaries. Without much loss of generality, it suffices to state that objects in images are generally between these two types of objects. Thus, choosing k such that $-1 \le k \le 1$ can cover most cases and the equation (27) is generally a decreasing function for this range.

As can be observed from the above equation (34), attention must be directed to the fact that r is influenced by the resolution of the image, that is, r is proportional to $2^m$. This is the reason for the factor $2^m$ being introduced in the above section [1.4.1].

[1.4.3] Dynamic Determination of η

The parameter η can also be automatically determined in a similar manner. Initially, η is set to zero, and the final mapping $f^{(n)}$ and the energy $C_f^{(n)}$ at the finest resolution are computed. Then, after η is increased by a certain value Δη, the final mapping $f^{(n)}$ and the energy $C_f^{(n)}$ at the finest resolution are again computed. This process is repeated until the optimal value of η is obtained. η represents the stiffness of the mapping because it is a weight of the following equation (35):

$$E_{0_{(i,j)}}^{(m,s)} = \|f^{(m,s)}(i, j) - f^{(m,s-1)}(i, j)\|^2 \quad (35)$$

Figure 4:
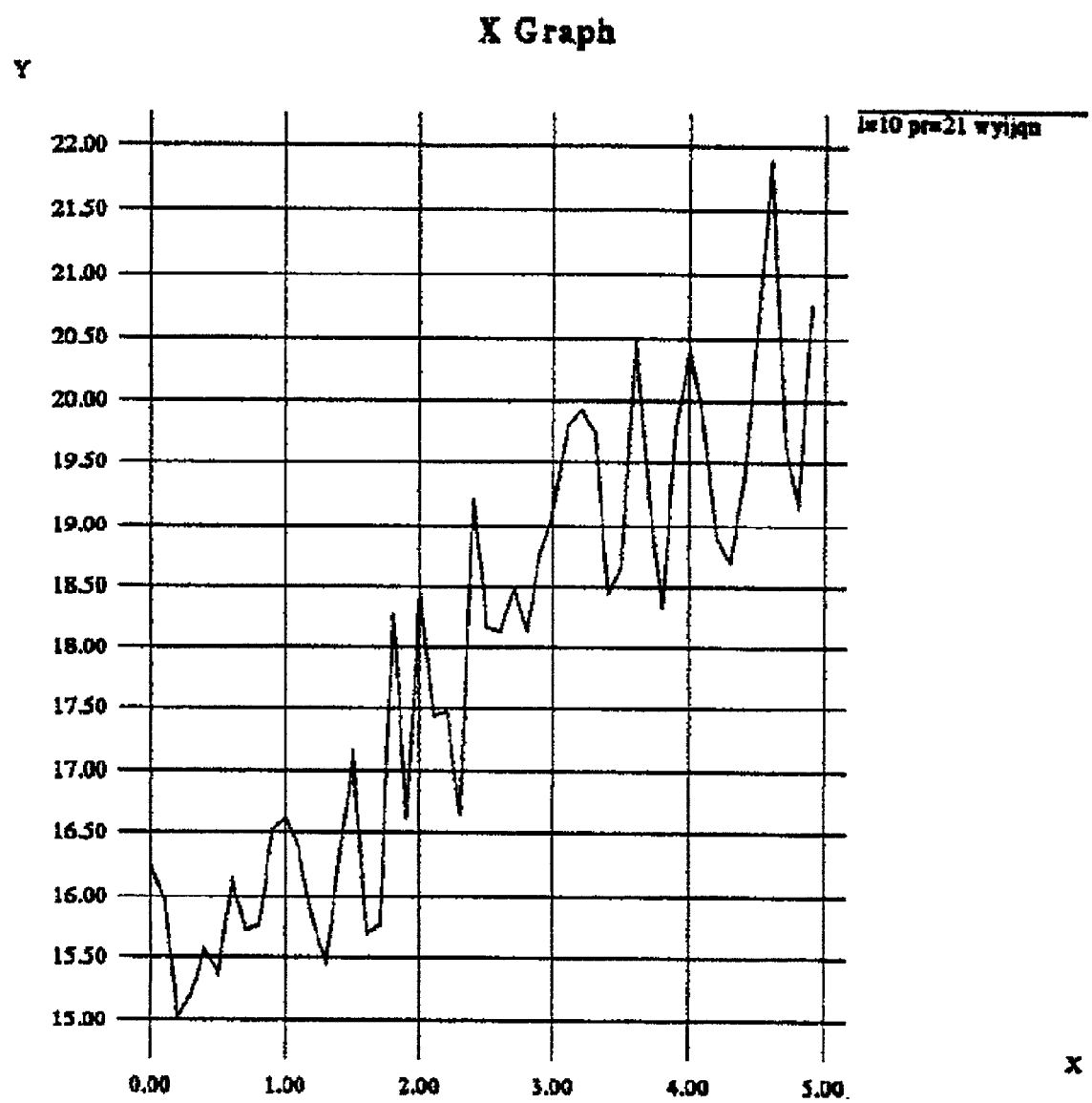
FIG. 4 shows the relationship between a parameter $\eta$ (represented by x-axis) and energy $C_f$ (represented by y-axis)

If η is zero, $D_f^{(n)}$ is determined irrespective of the previous submapping, and the present submapping may be elastically deformed and become too distorted. On the other hand, if η is a very large value, $D_f^{(n)}$ is almost completely determined by the immediately previous submapping. The submappings are then very stiff, and the pixels are mapped to almost the same locations. The resulting mapping is therefore the identity mapping. When the value of η increases from 0, $C_f^{(n)}$ gradually decreases as will be described later. However, when the value of η exceeds the optimal value, the energy starts increasing as shown in FIG. 4. In FIG. 4, the x-axis represents η, and y-axis represents $C_f$.

The optimum value of η which minimizes $C_f^{(n)}$ can be obtained in this manner. However, since various elements affect this computation as compared to the case of λ, $C_f^{(n)}$ changes while slightly fluctuating. This difference is caused because a submapping is re-computed once in the case of λ whenever an input changes slightly, whereas all the submappings must be re-computed in the case of η. Thus, whether the obtained value of $C_f^{(n)}$ is the minimum or not cannot be determined as easily. When candidates for the minimum value are found, the true minimum needs to be searched by setting up further finer intervals.

[1.5] Supersampling

When deciding the correspondence between the pixels, the range of $f^{(m,s)}$ can be expanded to R×R (R being the set of real numbers) in order to increase the degree of freedom. In this case, the intensity of the pixels of the destination image is interpolated, to provide $f^{(m,s)}$ ) having an intensity at non-integer points:

$$V(q_{f^{(m,s)}(i,j)}^{(m,s)}) \quad (36)$$

That is, supersampling is performed. In an example implementation, $f^{(m,s)}$ may take integer and half integer values, and $$V(q_{(i,j)+(0.5,0.5)}^{(m,s)}) \quad (37)$$

is given by $$(V(q_{(i,j)}^{(m,s)}) + V(q_{(i,j)+(1,1)}^{(m,s)}))/2 \quad (38)$$

[1.6] Normalization of the Pixel Intensity of Each Image

When the source and destination images contain quite different objects, the raw pixel intensity may not be used to compute the mapping because a large difference in the pixel intensity causes excessively large energy $C_f^{(m,s)}$ and thus making it difficult to obtain an accurate evaluation.

For example, a matching between a human face and a cat's face is computed as shown in FIGS. 20(a) and 20(b). The cat's face is covered with hair and is a mixture of very bright pixels and very dark pixels. In this case, in order to compute the submappings of the two faces, subimages are normalized. That is, the darkest pixel intensity is set to 0 while the brightest pixel intensity is set to 255, and other pixel intensity values are obtained using linear interpolation.

[1.7] Implementation

In an example implementation, a heuristic method is utilized wherein the computation proceeds linearly as the source image is scanned. First, the value of $f^{(m,s)}$ is determined at the top leftmost pixel (i,j)=(0,0). The value of each $f^{(m,s)}(i,j)$ is then determined while i is increased by one at each step. When i reaches the width of the image, j is increased by one and i is reset to zero. Thereafter, $f^{(m,s)}(i,j)$ is determined while scanning the source image. Once pixel correspondence is determined for all the points, it means that a single mapping $f^{(m,s)}$ is determined.

When a corresponding point $q_{f(i,j)}$ is determined for $p_{(i,j)}$, a corresponding point $q_{f(i,j+1)}$ of $p_{(i,j+1)}$ is determined next. The position of $q_{f(i,j+1)}$ is constrained by the position of $q_{f(i,j)}$ since the position of $q_{f(i,j+1)}$ satisfies the BC. Thus, in this system, a point whose corresponding point is determined earlier is given higher priority. If the situation continues in which (0,0) is always given the highest priority, the final mapping might be unnecessarily biased. In order to avoid this bias, $f^{(m,s)}$ is determined in the following manner in the base technology.

First, when (s mod 4) is 0, $f^{(m,s)}$ is determined starting from (0,0) while gradually increasing both i and j. When (s mod 4) is 1, $f^{(m,s)}$ is determined starting from the top rightmost location while decreasing i and increasing j. When (s mod 4) is 2, $f^{(m,s)}$ is determined starting from the bottom rightmost location while decreasing both i and j. When (s mod 4) is 3, $f^{(m,s)}$ is determined starting from the bottom leftmost location while increasing i and decreasing j. Since a concept such as the submapping, that is, a parameter s, does not exist in the finest n-th level, $f^{(m,s)}$ is computed continuously in two directions on the assumption that s=0 and s=2.

In this implementation, the values of $f^{(m,s)}(i,j)$ (m=0, ..., n) that satisfy the BC are chosen as much as possible from the candidates (k,l) by imposing a penalty on the candidates violating the BC. The energy $D_{(k,l)}$ of a candidate that violates the third condition of the BC is multiplied by Φ and that of a candidate that violates the first or second condition of the BC is multiplied by Ψ. In this implementation, Φ=2 and Ψ=100000 are used.

In order to check the above-mentioned BC, the following test may be performed as the procedure when determining (k,l)=$f^{(m,s)}(i,j)$. Namely, for each grid point (k,l) in the inherited quadrilateral of $f^{(m,s)}(i,j)$, whether or not the z-component of the outer product of $$W = \vec{A} \times \vec{B} \quad (39)$$

is equal to or greater than 0 is examined, where $$\vec{A} = \overrightarrow{q_{f^{(m,s)}(i,j-1)}^{(m,s)} q_{f^{(m,s)}(i+1,j-1)}^{(m,s)}} \quad (40)$$

$$\vec{B} = \overrightarrow{q_{f^{(m,s)}(i,j-1)}^{(m,s)} q_{(k,l)}^{(m,s)}} \quad (41)$$

Here, the vectors are regarded as 3D vectors and the z-axis is defined in the orthogonal right-hand coordinate system. When W is negative, the candidate is imposed with a penalty by multiplying $D_{(k,l)}^{(m,s)}$ by Ψ so that it is not as likely to be selected.

Figure 5A:
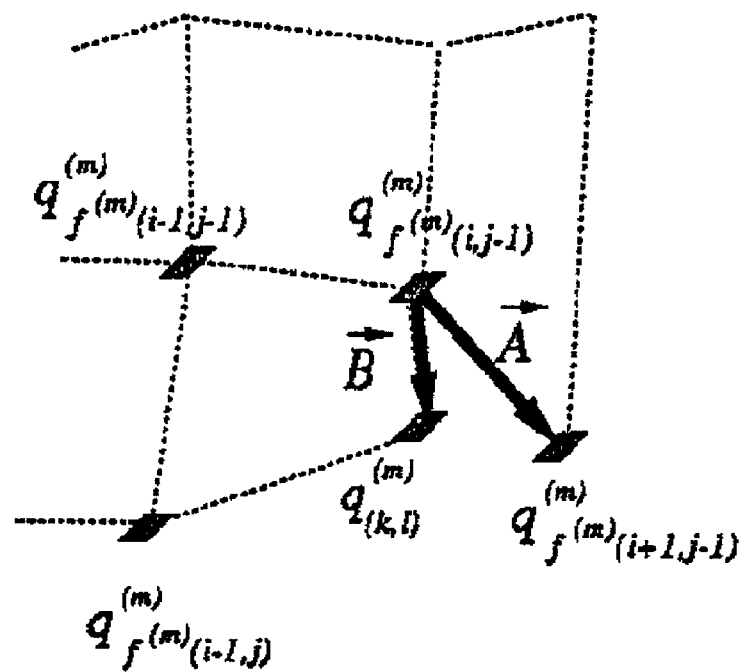
FIG. 5(a) is a diagram illustrating determination of whether or not the mapping for a certain point satisfies the bijectivity condition through the outer product computation.
Figure 5B:
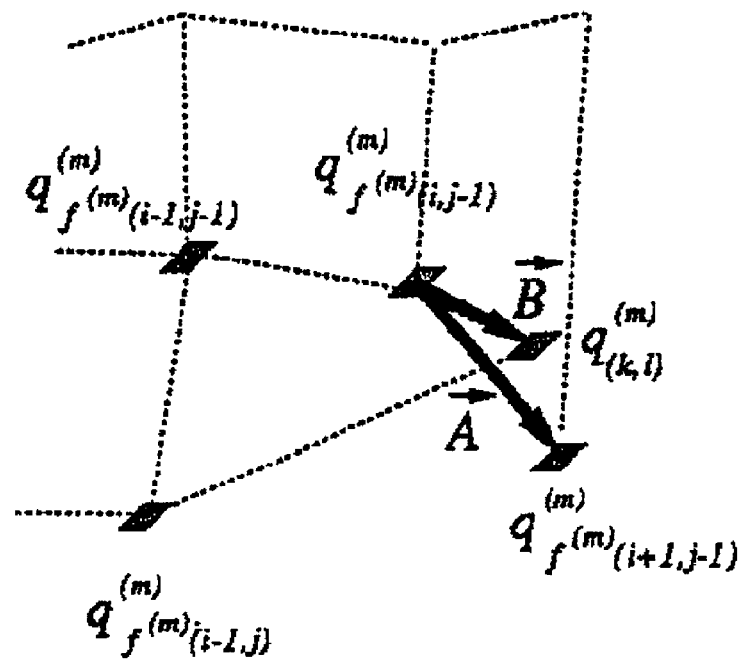
FIG. 5(b) is a diagram illustrating determination of whether or not the mapping for a certain point satisfies the bijectivity condition through the outer product computation.

FIGS. 5(a) and 5(b) illustrate the reason why this condition is inspected. FIG. 5(a) shows a candidate without a penalty and FIG. 5(b) shows one with a penalty. When determining the mapping $f^{(m,s)}(i,j+1)$ for the adjacent pixel at (i,j+1), there is no pixel on the source image plane that satisfies the BC if the z-component of W is negative because then $q_{(k,l)}^{(m,s)}$ passes the boundary of the adjacent quadrilateral.

[1.7.1] The Order of Submappings

In this implementation, σ(0)=0, σ(1)=1, σ(2)=2, σ(3)=3, σ(4)=0 are used when the resolution level is even, while σ(0)=3, σ(1)=2, σ(2)=1, σ(3)=0, σ(4)=3 are used when resolution level is odd. Thus, the submappings are shuffled to some extent. It is to be noted that the submappings are primarily of four types, and s may be any of 0 to 3. However, a processing with s=4 is used in this implementation for a reason to be described later.

[1.8] Interpolations

After the mapping between the source and destination images is determined, the intensity values of the corresponding pixels are interpolated. In the implementation, trilinear interpolation is used. Suppose that a square $P_{(i,j)}P_{(i+1,j)}P_{(i+1,j+1)}P_{(i,j+1)}$ on the source image plane is mapped to a quadrilateral $q_{f(i,j)}q_{f(i+1,j)}q_{f(i+1,j+1)}q_{f(i,j+1)}$ on the destination image plane. For simplicity, the distance between the image planes is assumed to be 1. The intermediate image pixels r(x,y,t) ($0 \leq x \leq N-1$, $0 \leq y \leq M-1$) whose distance from the source image plane is t ($0 \leq t \leq 1$) are obtained as follows. First, the location of the pixel r(x,y,t), where x,y,t∈R, is determined by equation (42):

$$(x,y) = (1-dx)(1-dy)(1-t)(i,j) + (1-dx)(1-dy)tf(i,j) + dx(1-dy)(1-t)(i+1,j) + dx(1-dy)tf(i+1,j) + (1-dx)dy(1-t)(i,j+1) + (1-dx)dytf(i,j+1) + dxdy(1-t)(i+1,j+1) + dxdytf(i+1,j+1) \quad (42)$$

The value of the pixel intensity at r(x,y,t) is then determined by equation (43):

$$V(r(x,y,t)) = (1-dx)(1-dy)(1-t)V(p_{(i,j)}) + (1-dx)(1-dy)tV(q_{f(i,j)}) + dx(1-dy)(1-t)V(p_{(i+1,j)}) + dx(1-dy)tV(q_{f(i+1,j)}) + (1-dx)dy(1-t)V(p_{(i,j+1)}) + (1-dx)dytV(q_{f(i,j+1)}) + dxdy(1-t)V(p_{(i+1,j+1)}) + dxdytV(q_{f(i+1,j+1)}) \quad (43)$$

where dx and dy are parameters varying from 0 to 1.

[1.9] Mapping to which Constraints are Imposed

So far, the determination of a mapping in which no constraints are imposed has been described. However, if a correspondence between particular pixels of the source and destination images is provided in a predetermined manner, the mapping can be determined using such correspondence as a constraint.

The basic idea is that the source image is roughly deformed by an approximate mapping which maps the specified pixels of the source image to the specified pixels of the destination image and thereafter a mapping f is accurately computed.

First, the specified pixels of the source image are mapped to the specified pixels of the destination image, then the approximate mapping that maps other pixels of the source image to appropriate locations are determined. In other words, the mapping is such that pixels in the vicinity of a specified pixel are mapped to locations near the position to which the specified one is mapped. Here, the approximate mapping at the m-th level in the resolution hierarchy is denoted by $F^{(m)}$.

The approximate mapping F is determined in the following manner. First, the mappings for several pixels are specified. When $n_s$ pixels $$p(i_0,j_0), p(i_1,j_1), \ldots, p(i_{n_s-1}, j_{n_s-1}) \quad (44)$$

of the source image are specified, the following values in the equation (45) are determined.

$$F^{(n)}(i_0,j_0) = (k_0,l_0), F^{(n)}(i_1,j_1) = (k_1,l_1), \ldots, F^{(n)}(i_{n_s-1}, j_{n_s-1}) = (k_{n_s-1}, l_{n_s-1}) \quad (45)$$

For the remaining pixels of the source image, the amount of displacement is the weighted average of the displacement of $p(i_h,j_h)$ (h=0, ..., $n_s$-1). Namely, a pixel $p_{(i,j)}$ is mapped to the following pixel (expressed by the equation (46)) of the destination image.

$$F^{(m)}(i,j) = \frac{(i,j) + \sum_{h=0}^{h=n_s-1}(k_h - i_h, l_h - j_h)weight_h(i,j)}{2^{n-m}} \quad (46)$$

where $$weight_h(i,j) = \frac{1/\|(i_h - i, j_h - j)\|^2}{total\_weight(i,j)} \quad (47)$$

where $$total\_weight(i,j) = \sum_{h=0}^{h=n_s-1} 1/\|(i_h - i, j_h - j)\|^2 \quad (48)$$

Second, the energy $D_{(i,j)}^{(m,s)}$ of the candidate mapping f is changed so that a mapping f similar to $F^{(m)}$ has a lower energy. Precisely speaking, $D_{(i,j)}^{(m,s)}$ is expressed by the equation (49):

$$D_{(i,j)}^{(m,s)} = E_{0(i,j)}^{(m,s)} + \eta E_{1(i,j)}^{(m,s)} + \kappa E_{2(i,j)}^{(m,s)} \quad (49)$$

where $$E_{2(i,j)}^{(m,s)} = \begin{cases} 0, & \text{if } \|F^{(m)}(i,j) - f^{(m,s)}(i,j)\|^2 \leq \left\lfloor \frac{\rho^2}{2^{2(n-m)}} \right\rfloor \\ \|F^{(m)}(i,j) - f^{(m,s)}(i,j)\|^2, & \text{otherwise} \end{cases} \quad (50)$$

where $\kappa, \rho \geq 0$. Finally, the resulting mapping f is determined by the above-described automatic computing process.

Note that $E_{2(i,j)}^{(m,s)}$ becomes 0 if $f^{(m,s)}(i,j)$ is sufficiently close to $F^{(m)}(i,j)$ i.e., the distance therebetween is equal to or less than $$\left\lfloor \frac{\rho^2}{2^{2(n-m)}} \right\rfloor \quad (51)$$

This has been defined in this way because it is desirable to determine each value $f^{(m,s)}(i,j)$ automatically to fit in an appropriate place in the destination image as long as each value $f^{(m,s)}(i,j)$ is close to $F^{(m)}(i,j)$. For this reason, there is no need to specify the precise correspondence in detail to have the source image automatically mapped so that the source image matches the destination image.

[2] Concrete Processing Procedure

The flow of a process utilizing the respective elemental techniques described in [1] will now be described.

Figure 6:
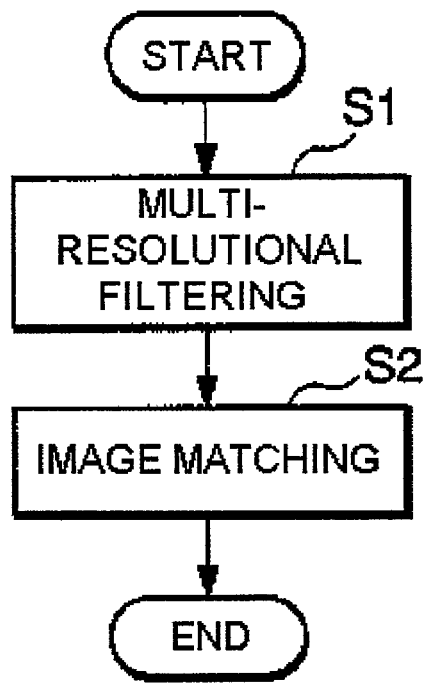
FIG. 6 is a flowchart of the entire procedure of a preferred embodiment in the base technology.

FIG. 6 is a flowchart of the overall procedure of the base technology. Referring to FIG. 6, a source image and destination image are first processed using a multiresolutional critical point filter (S1). The source image and the destination image are then matched (S2). As will be understood, the matching (S2) is not required in every case, and other processing such as image recognition may be performed instead, based on the characteristics of the source image obtained at S1.

Figure 7:
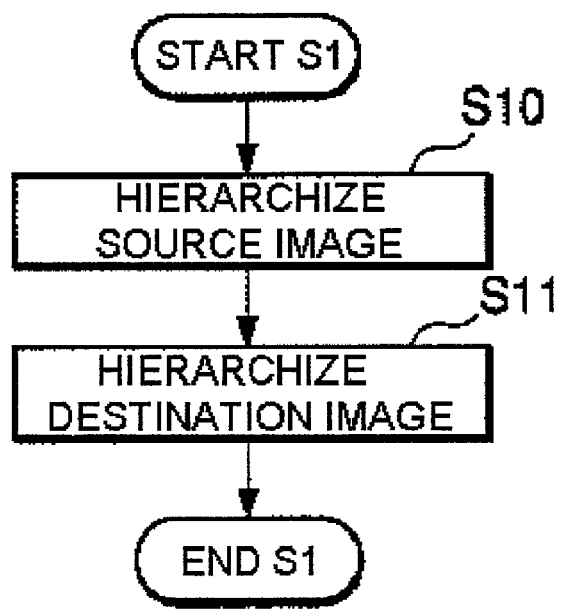
FIG. 7 is a flowchart showing the details of the process at S1 in FIG. 6.

FIG. 7 is a flowchart showing details of the process S1 shown in FIG. 6. This process is performed on the assumption that a source image and a destination image are matched at S2. Thus, a source image is first hierarchized using a critical point filter (S10) so as to obtain a series of source hierarchical images. Then, a destination image is hierarchized in the similar manner (S11) so as to obtain a series of destination hierarchical images. The order of S10 and S11 in the flow is arbitrary, and the source image and the destination image can be generated in parallel. It may also be possible to process a number of source and destination images as required by subsequent processes.

Figure 8:
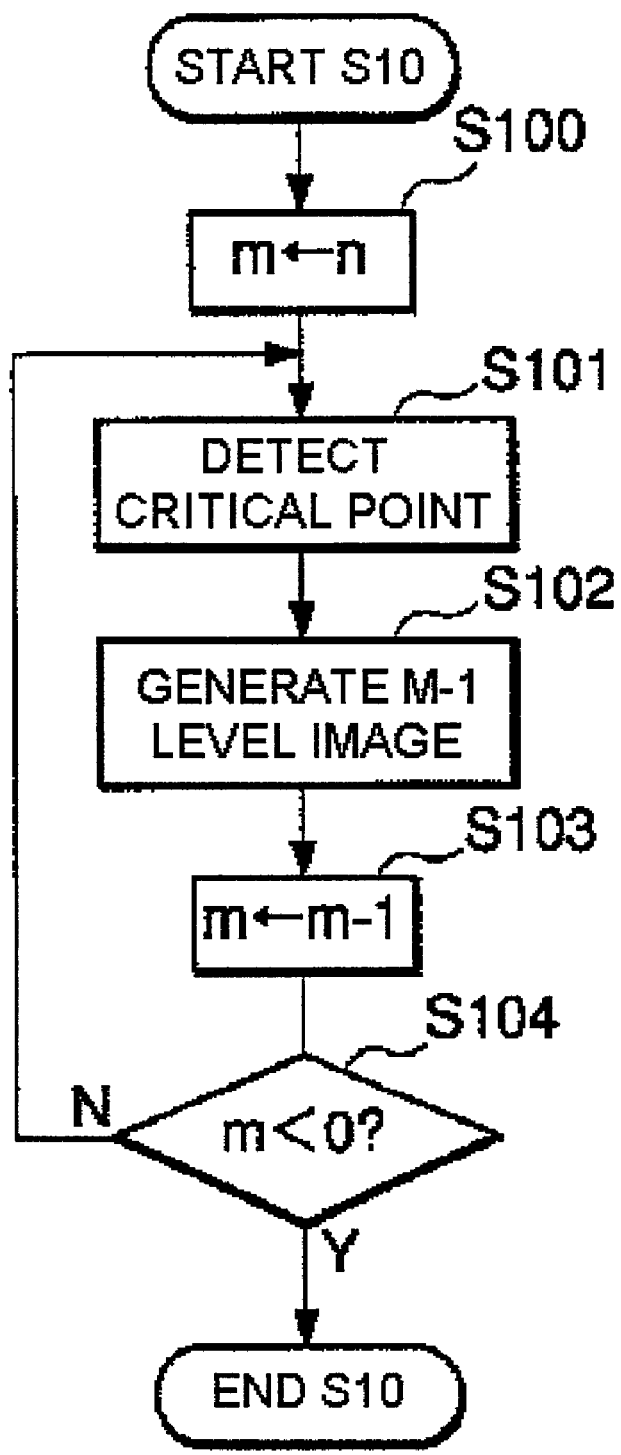
FIG. 8 is a flowchart showing the details of the process at S10 in FIG. 7.

FIG. 8 is a flowchart showing details of the process at S10 shown in FIG. 7. Suppose that the size of the original source image is $2^n \times 2^n$. Since source hierarchical images are sequentially generated from an image with a finer resolution to one with a coarser resolution, the parameter m which indicates the level of resolution to be processed is set to n (S100). Then, critical points are detected from the images $p^{(m,0)}$, $p^{(m,1)}$, $p^{(m,2)}$ and $p^{(m,3)}$ of the m-th level of resolution, using a critical point filter (S101), so that the images $p^{(m-1,0)}$, $p^{(m-1,1)}$, $p^{(m-1,2)}$ and $p^{(m-1,3)}$ of the (m-1)th level are generated (S102). Since m=n here, $p^{(m,0)} = p^{(m,1)} = p^{(m,2)} = p^{(m,3)} = p^{(n)}$ holds and four types of subimages are thus generated from a single source image.

Figure 9:
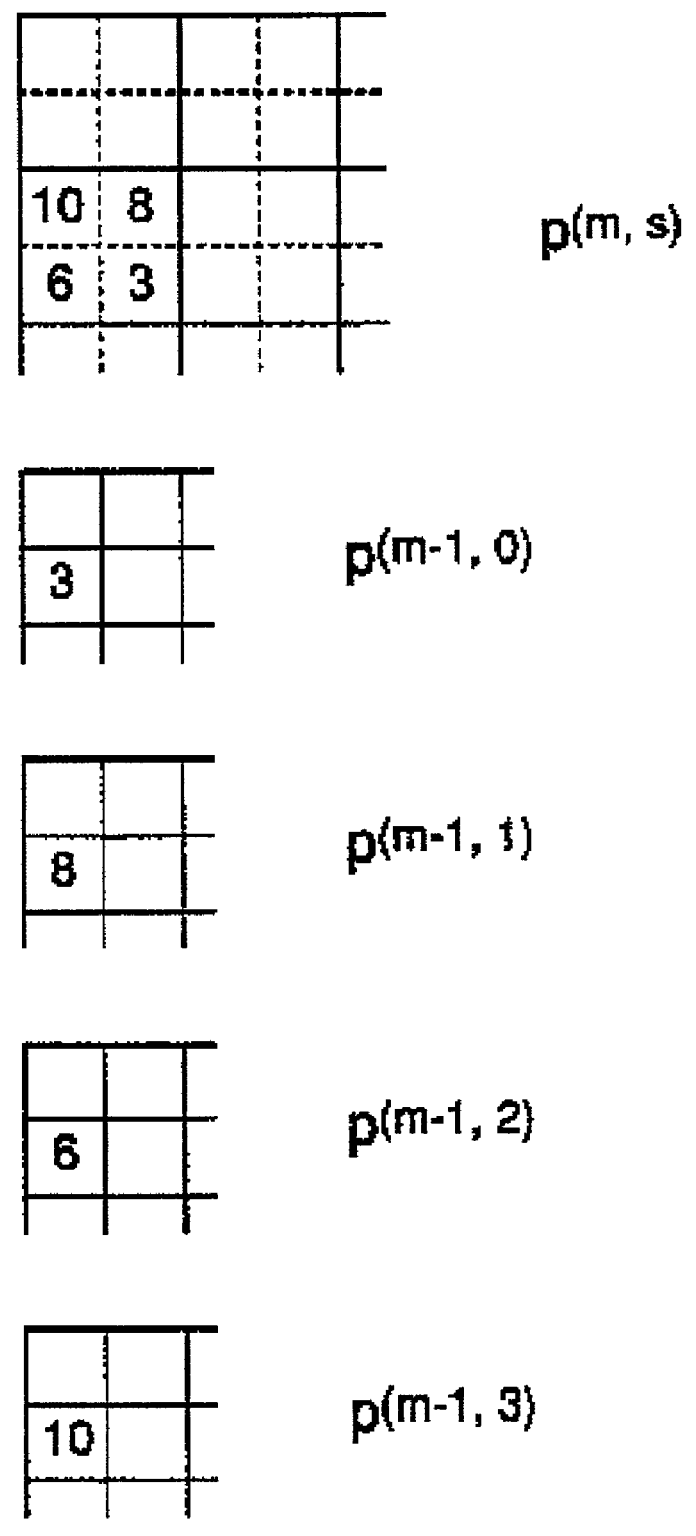

FIG. 9 shows correspondence between partial images of the m-th and those of (m-1)th levels of resolution. Referring to FIG. 9, respective numberic values shown in the figure represent the intensity of respective pixels. $p^{(m,s)}$ symbolizes any one of four images $p^{(m,0)}$ through $p^{(m,3)}$, and when generating $p^{(m-1,0)}$, $p^{(m,0)}$ is used from $p^{(m,s)}$. For example, as for the block shown in FIG. 9, comprising four pixels with their pixel intensity values indicated inside, images $p^{(m-1,0)}$, $p^{(m-1,1)}$, $p^{(m-1,2)}$ and $p^{(m-1,3)}$ acquire "3", "8", "6" and "10", respectively, according to the rules described in [1.2]. This block at the m-th level is replaced at the (m-1)th level by respective single pixels thus acquired. Therefore, the size of the subimages at the (m-1)th level is $2^{m-1} \times 2^{m-1}$.

After m is decremented (S103 in FIG. 8), it is ensured that m is not negative (S104). Thereafter, the process returns to S101, so that subimages of the next level of resolution, i.e., a next coarser level, are generated. The above process is repeated until subimages at m=0 (0-th level) are generated to complete the process at S10. The size of the subimages at the 0-th level is 1×1.

Figure 10:
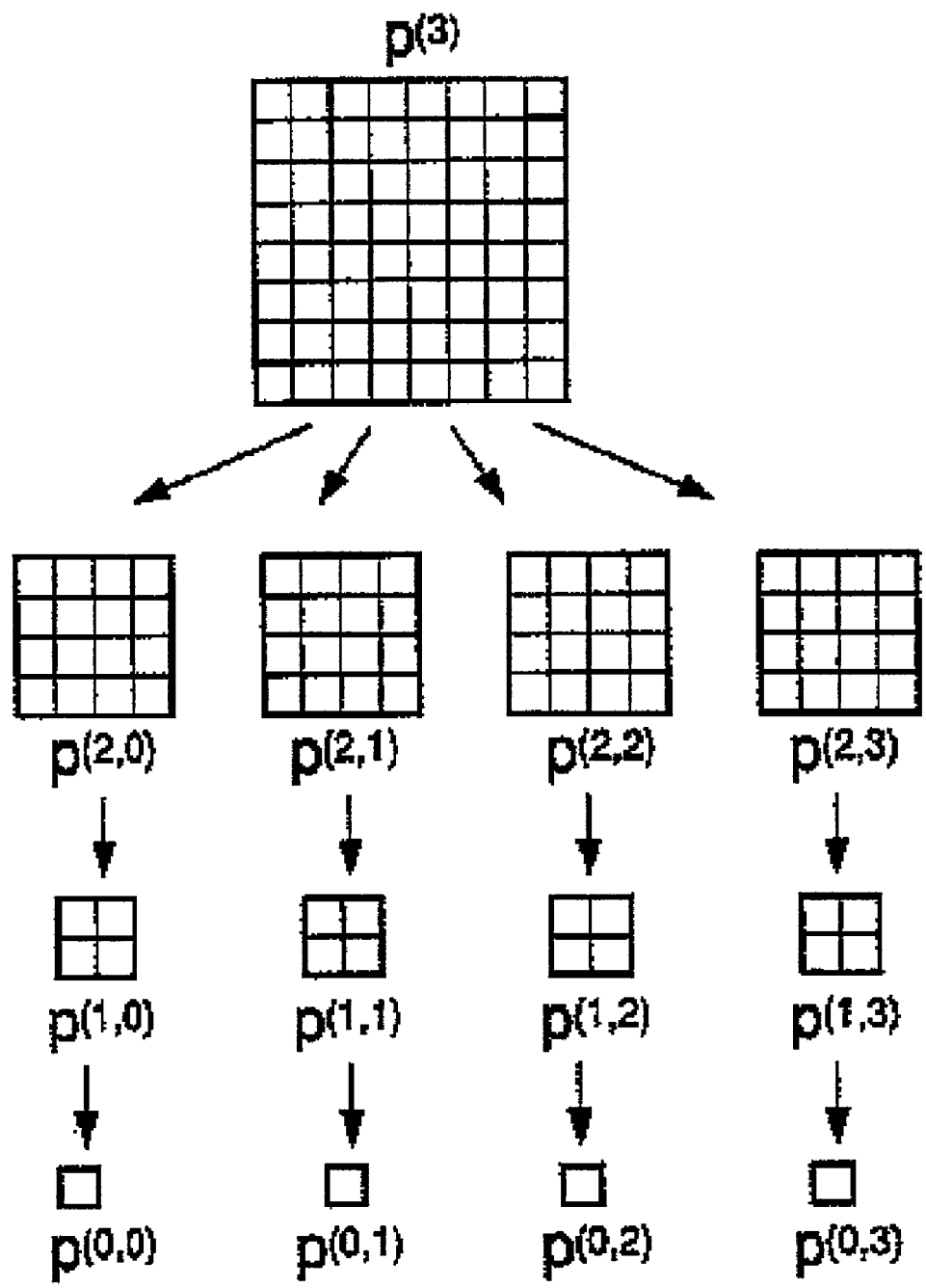
FIG. 10 is a diagram showing source hierarchical images generated in the embodiment in the base technology.

FIG. 10 shows source hierarchical images generated at S10 in the case of n=3. The initial source image is the only image common to the four series followed. The four types of subimages are generated independently, depending on the type of critical point. Note that the process in FIG. 8 is common to S11 shown in FIG. 7, and that destination hierarchical images are generated through a similar procedure. Then, the process at S1 in FIG. 6 is completed.

Figure 11:
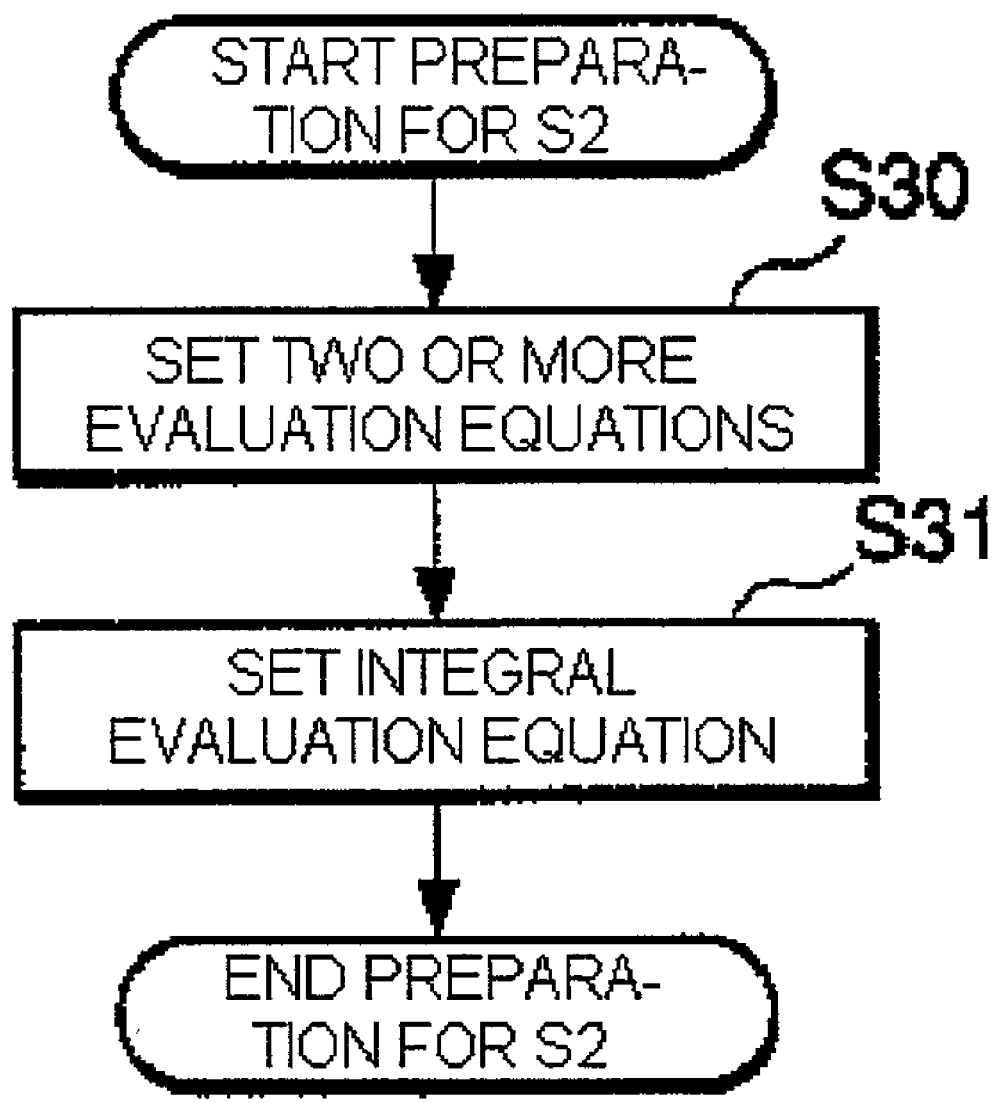
FIG. 11 is a flowchart of a preparation procedure for S2 in FIG. 6.

In this base technology, in order to proceed to S2 shown in FIG. 6 a matching evaluation is prepared. FIG. 11 shows the preparation procedure. Referring to FIG. 11, a plurality of evaluation equations are set (S30). The evaluation equations may include the energy $C_f^{(m,s)}$ concerning a pixel value, introduced in [1.3.2.1], and the energy $D_f^{(m,s)}$ concerning the smoothness of the mapping introduced in [1.3.2.2]. Next, by combining these evaluation equations, a combined evaluation equation is set (S31). Such a combined evaluation equation may be $\lambda C_{(i,j)}^{(m,s)} + D_f^{(m,s)}$. Using η introduced in [1.3.2.2], we have $$\sum \sum (\lambda C_{(i,j)}^{(m,s)} + \eta E_{0(i,j)}^{(m,s)} + E_{1(i,j)}^{(m,s)}) \quad (52)$$

In the equation (52) the sum is taken for each i and j where i and j run through 0, 1, ..., $2^{m-1}$. Now, the preparation for matching evaluation is completed.

Figure 12:
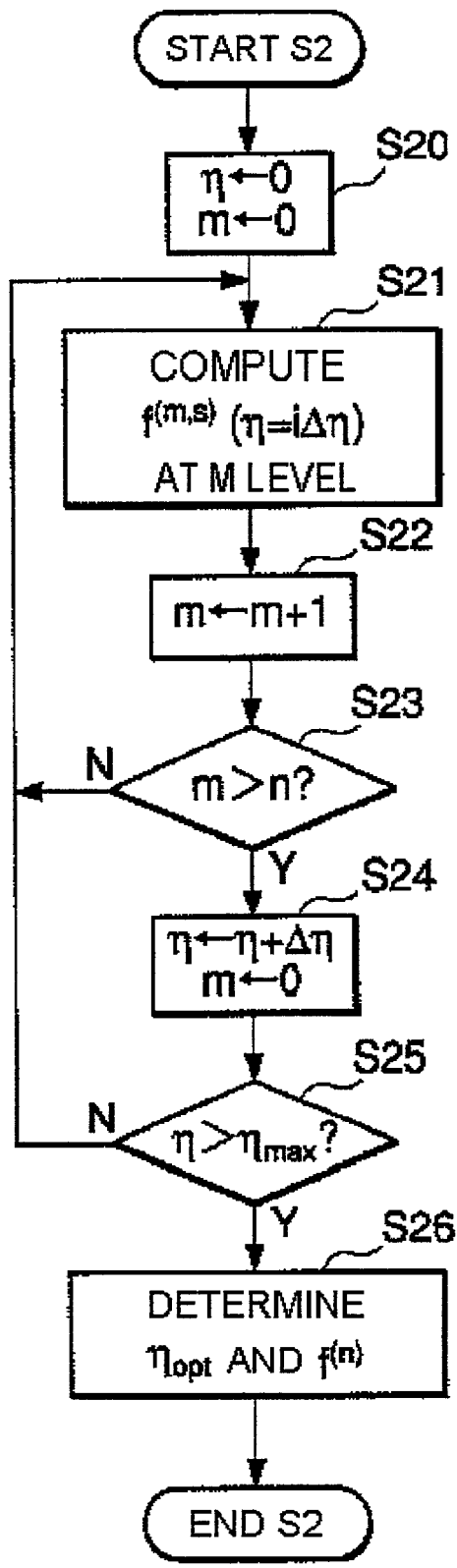
FIG. 12 is a flowchart showing the details of the process at S2 in FIG. 6.

FIG. 12 is a flowchart showing the details of the process of S2 shown in FIG. 6. As described in [1], the source hierarchical images and destination hierarchical images are matched between images having the same level of resolution. In order to detect global correspondence correctly, a matching is calculated in sequence from a coarse level to a fine level of resolution. Since the source and destination hierarchical images are generated using the critical point filter, the location and intensity of critical points are stored clearly even at a coarse level. Thus, the result of the global matching is superior to conventional methods.

Referring to FIG. 12, a coefficient parameter η and a level parameter m are set to 0 (S20). Then, a matching is computed between the four subimages at the m-th level of the source hierarchical images and those of the destination hierarchical images at the m-th level, so that four types of submappings $f^{(m,s)}$ (s=0, 1, 2, 3) which satisfy the BC and minimize the energy are obtained (S21). The BC is checked by using the inherited quadrilateral described in [1.3.3]. In that case, the submappings at the m-th level are constrained by those at the (m-1)th level, as indicated by the equations (17) and (18). Thus, the matching computed at a coarser level of resolution is used in subsequent calculation of a matching. This is called a vertical reference between different levels. If m=0, there is no coarser level and this exceptional case will be described using FIG. 13.

A horizontal reference within the same level is also performed. As indicated by the equation (20) in [1.3.3], $f^{(m,3)}$, $f^{(m,2)}$ and $f^{(m,1)}$ are respectively determined so as to be analogous to $f^{(m,2)}$, $f^{(m,1)}$ and $f^{(m,0)}$. This is because a situation in which the submappings are totally different seems unnatural even though the type of critical points differs so long as the critical points are originally included in the same source and destination images. As can been seen from the equation (20), the closer the submappings are to each other, the smaller the energy becomes, so that the matching is then considered more satisfactory.

As for $f^{(m,0)}$, which is to be initially determined, a coarser level by one may be referred to since there is no other submapping at the same level to be referred to as shown in the equation (19). In this base technology, however, a procedure is adopted such that after the submappings were obtained up to $f^{(m,3)}$, $f^{(m,0)}$ is recalculated once utilizing the thus obtained subamppings as a constraint. This procedure is equivalent to a process in which s=4 is substituted into the equation (20) and $f^{(m,4)}$ is set to $f^{(m,0)}$ anew. The above process is employed to avoid the tendency in which the degree of association between $f^{(m,0)}$ and $f^{(m,3)}$ becomes too low. This scheme actually produced a preferable result. In addition to this scheme, the submappings are shuffled in the experiment as described in [1.7.1], so as to closely maintain the degrees of association among submappings which are originally determined independently for each type of critical point. Furthermore, in order to prevent the tendency of being dependent on the starting point in the process, the location thereof is changed according to the value of s as described in [1.7].

Figure 13:
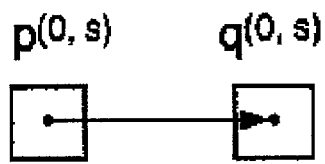
FIG. 13 is a diagram showing the way a submapping is determined at the 0-th level.
Figure 14:
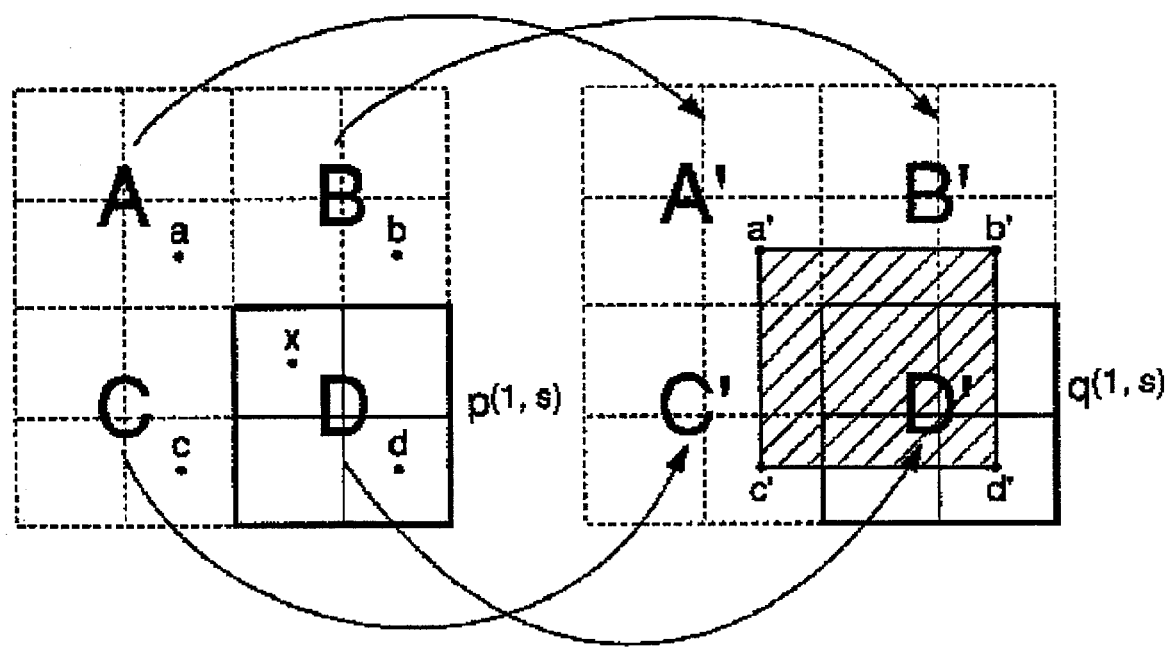
FIG. 14 is a diagram showing the way a submapping is determined at the first level.

FIG. 13 illustrates how the submapping is determined at the 0-th level. Since at the 0-th level each sub-image is consititured by a single pixel, the four submappings $f^{(0,s)}$ are automatically chosen as the identity mapping. FIG. 14 shows how the submappings are determined at the first level. At the first level, each of the sub-images is constituted of four pixels, which are indicated by solid lines. When a corresponding point (pixel) of the point (pixel) x in $p^{(1,s)}$ is searched within $q^{(1,s)}$, the following procedure is adopted:

1. An upper left point a, an upper right point b, a lower left point c and a lower right point d with respect to the point x are obtained at the first level of resolution.

2. Pixels to which the points a to d belong at a coarser level by one, i.e., the 0-th level, are searched. In FIG. 14, the points a to d belong to the pixels A to D, respectively. However, the pixels A to C are virtual pixels which do not exist in reality.
3. The corresponding points A' to D' of the pixels A to D, which have already been defined at the 0-th level, are plotted in $q^{(1,s)}$. The pixels A' to C' are virtual pixels and regarded to be located at the same positions as the pixels A to C.
4. The corresponding point a' to the point a in the pixel A is regarded as being located inside the pixel A', and the point a' is plotted. Then, it is assumed that the position occupied by the point a in the pixel A (in this case, positioned at the lower right) is the same as the position occupied by the point a' in the pixel A'.
5. The corresponding points b' to d' are plotted by using the same method as the above 4 so as to produce an inherited quadrilateral defined by the points a' to d'.
6. The corresponding point x' of the point x is searched such that the energy becomes minimum in the inherited quadrilateral. Candidate corresponding points x' may be limited to the pixels, for instance, whose centers are included in the inherited quadrilateral. In the case shown in FIG. 14, the four pixels all become candidates.

The above described is a procedure for determining the corresponding point of a given point x. The same processing is performed on all other points so as to determine the submappings. As the inherited quadrilateral is expected to become deformed at the upper levels (higher than the second level), the pixels A' to D' will be positioned apart from one another as shown in FIG. 3.

Once the four submappings at the m-th level are determined in this manner, m is incremented (S22 in FIG. 12). Then, when it is confirmed that m does not exceed n (S23), return to S21. Thereafter, every time the process returns to S21, submappings at a finer level of resolution are obtained until the process finally returns to S21 at which time the mapping $f^{(n)}$ at the n-th level is determined. This mapping is denoted as $f^{(n)}$ ($\eta$=0) because it has been determined relative to $\eta$=0.

Next, to obtain the mapping with respect to other different $\eta$, $\eta$ is shifted by $\Delta\eta$ and m is reset to zero (S24). After confirming that new $\eta$ does not exceed a predetermined search-stop value $\eta_{max}$ (S25), the process returns to S21 and the mapping $f^{(n)}$ ($\eta$=$\Delta\eta$) relative to the new $\eta$ is obtained. This process is repeated while obtaining $f^{(n)}$($\eta$=i$\Delta\eta$)(i=0, 1, . . . ) at S21. When $\eta$ exceeds $\eta_{max}$, the process proceeds to S26 and the optimal $\eta$=$\eta_{opt}$ is determined using a method described later, so as to let $f^{(n)}$($\eta$=$\eta_{opt}$) be the final mapping $f^{(n)}$.

Figure 15:
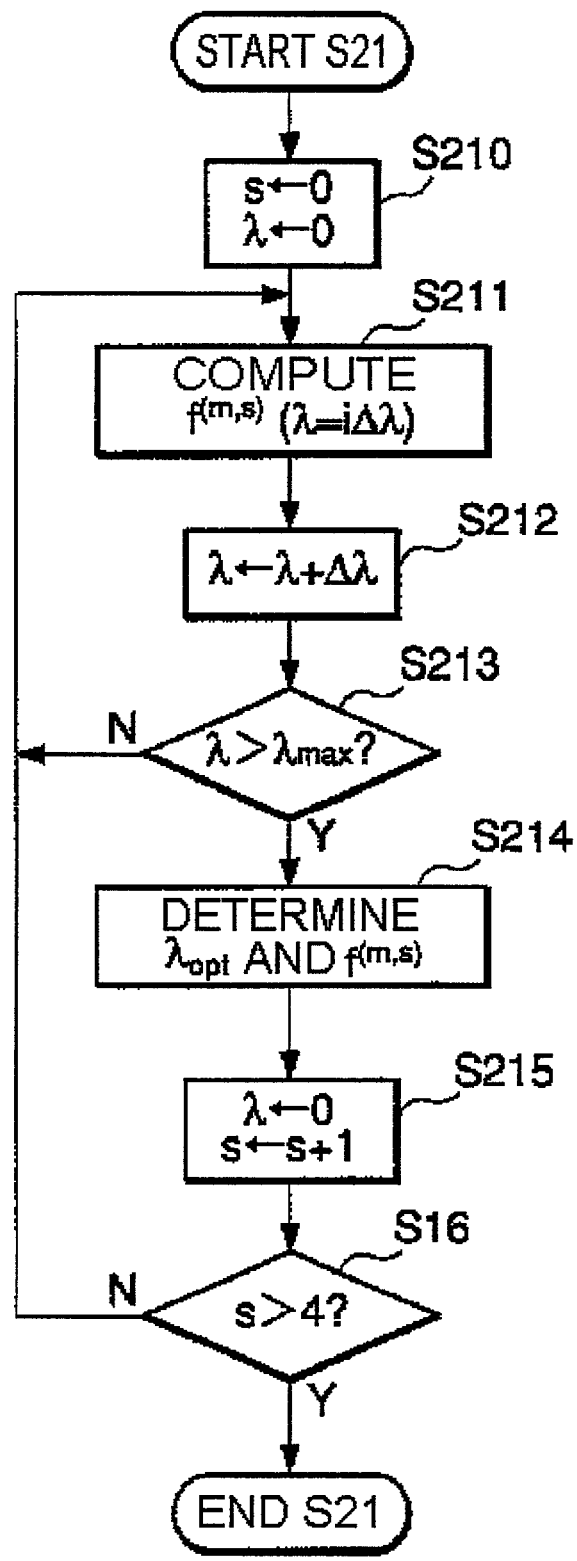
FIG. 15 is a flowchart showing the details of the process at S21 in FIG. 12.

FIG. 15 is a flowchart showing the details of the process of S21 shown in FIG. 12. According to this flowchart, the submappings at the m-th level are determined for a certain predetermined $\eta$. In this base technology, when determining the mappings, the optimal $\lambda$ is defined independently for each submapping.

Referring to FIG. 15, s and $\lambda$ are first reset to zero (S210). Then, obtained is the submapping $f^{(m,s)}$ that minimizes the energy with respect to the then $\lambda$ (and, implicitly, $\eta$) (S211), and the thus obtained submapping is denoted as $f^{(m,s)}$($\lambda$=0). In order to obtain the mapping with respect to other different $\lambda$, $\lambda$ is shifted by $\Delta\lambda$. After confirming that the new $\lambda$ does not exceed a predetermined search-stop value $\lambda_{max}$ (S213), the process returns to S211 and the mapping $f^{(m,s)}$ ($\lambda$=$\Delta\lambda$) relative to the new $\lambda$ is obtained. This process is repeated while obtaining $f^{(m,s)}$($\lambda$=i$\Delta\lambda$)(i=0, 1, . . . ). When $\lambda$ exceeds $\lambda_{max}$, the process proceeds to S214 and the optimal $\lambda$=$\lambda_{opt}$ is determined, so as to let $f^{(n)}$($\lambda$=$\lambda_{opt}$) be the final mapping $f^{(m,s)}$ (S214).

Next, in order to obtain other submappings at the same level, $\lambda$ is reset to zero and s is incremented (S215). After confirming that s does not exceed 4 (S216), return to S211. When s=4, $f^{(m,0)}$ is renewed utilizing $f^{(m,3)}$ as described above and a submapping at that level is determined.

Figure 16:
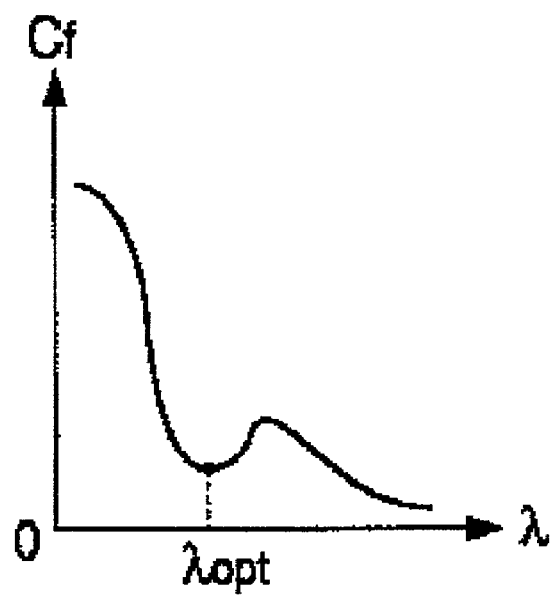
FIG. 16 is a graph showing the behavior of energy $C_f^{(m,s)}$ corresponding to $f^{(m,s)}$ ($\lambda=i\Delta\lambda$) which has been obtained for a certain $f^{(m,s)}$ while varying $\lambda$.

FIG. 16 shows the behavior of the energy $C_f^{(m,s)}$ corresponding to $f^{(m,s)}$($\lambda$=i$\Delta\lambda$)(i=0, 1, . . . ), for a certain m and s while varying $\lambda$. As described in [1.4], as $\lambda$ increases, $C_f^{(m,s)}$ normally decreases but changes to increase after $\lambda$ exceeds the optimal value. In this base technology, $\lambda$ in which $C_f^{(m,s)}$ becomes the minima is defined as $\lambda_{opt}$. As observed in FIG. 16, even if $C_f^{(m,s)}$ begins to decrease again in the range $\lambda$>$\lambda_{opt}$, the mapping will not be as good. For this reason, it suffices to pay attention to the first occurring minima value. In this base technology, $\lambda_{opt}$ is independently determined for each submapping including $f^{(n)}$.

Figure 17:
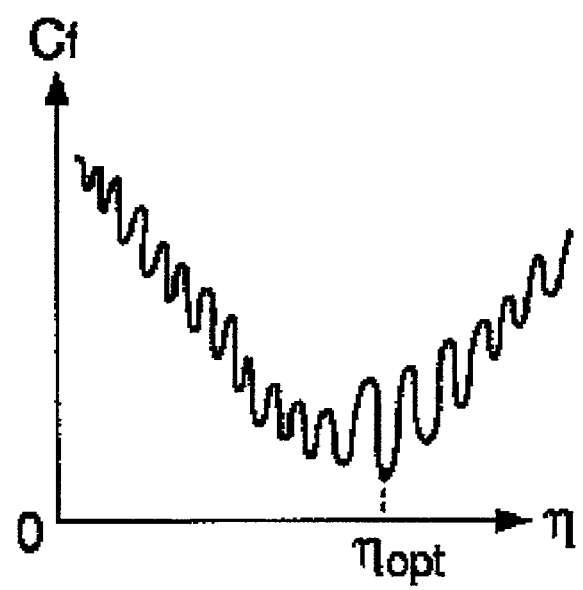
FIG. 17 is a diagram showing the behavior of energy $C_f^{(n)}$ corresponding to $f^{(n)}$ ($\eta=i\Delta\eta$)(i=0, 1, . . . ) which has been obtained while varying $\eta$.

FIG. 17 shows the behavior of the energy $C_f^{(n)}$ corresponding to $f^{(n)}$($\eta$=i$\Delta\eta$)(i=0, 1, . . . ) while varying $\eta$. Here too, $C_f^{(n)}$ normally decreases as $\eta$ increases, but $C_f^{(n)}$ changes to increase after $\eta$ exceeds the optimal value. Thus, $\eta$ in which $C_f^{(n)}$ becomes the minima is defined as $\eta_{opt}$. FIG. 17 can be considered as an enlarged graph around zero along the horizontal axis shown in FIG. 4. Once $\eta_{opt}$ is determined, $f^{(n)}$ can be finally determined.

As described above, this base technology provides various merits. First, since there is no need to detect edges, problems in connection with the conventional techniques of the edge detection type are solved. Furthermore, prior knowledge about objects included in an image is not necessitated, thus automatic detection of corresponding points is achieved. Using the critical point filter, it is possible to preserve intensity and locations of critical points even at a coarse level of resolution, thus being extremely advantageous when applied to object recognition, characteristic extraction, and image matching. As a result, it is possible to construct an image processing system which significantly reduces manual labor.

Some further extensions to or modifications of the above-described base technology may be made as follows:

(1) Parameters are automatically determined when the matching is computed between the source and destination hierarchical images in the base technology. This method can be applied not only to the calculation of the matching between the hierarchical images but also to computing the matching between two images in general.

For instance, an energy $E_0$ relative to a difference in the intensity of pixels and an energy $E_1$ relative to a positional displacement of pixels between two images may be used as evaluation equations, and a linear sum of these equations, i.e., $E_{tot}$=$\alpha E_0$+$E_1$, may be used as a combined evaluation equation. While paying attention to the neighborhood of the extrema in this combined evaluation equation, $\alpha$ is automatically determined. Namely, mappings which minimize $E_{tot}$ are obtained for various $\alpha$'s. Among such mappings, $\alpha$ at which $E_{tot}$ takes the minimum value is defined as an optimal parameter. The mapping corresponding to this parameter is finally regarded as the optimal mapping between the two images.

Many other methods are available in the course of setting up evaluation equations. For instance, a term which becomes larger as the evaluation result becomes more favorable, such as $1/E_1$ and $1/E_2$, may be employed. A combined evaluation equation is not necessarily a linear sum, but an n-powered sum (n=2, ½, −1, −2, etc.), a polynomial or an arbitrary function may be employed when appropriate.

The system may employ a single parameter such as the above α, two parameters such as η and λ as in the base technology, or more than two parameters. When there are more than three parameters used, they may be determined while changing one at a time.

(2) In the base technology, a parameter is determined in a two-step process. That is, in such a manner that a point at which $C_f^{(m,s)}$ takes the minima is detected after a mapping such that the value of the combined evaluation equation becomes minimum is determined. However, instead of this two-step processing, a parameter may be effectively determined, as the case may be, in a manner such that the minimum value of a combined evaluation equation becomes minimum. In this case, $\alpha E_0 + \beta E_1$, for example, may be used as the combined evaluation equation, where $\alpha + \beta = 1$ may be imposed as a constraint so as to equally treat each evaluation equation. The automatic determination of a parameter is effective when determining the parameter such that the energy becomes minimum.

(3) In the base technology, four types of submappings related to four types of critical points are generated at each level of resolution. However, one, two, or three types among the four types may be selectively used. For instance, if there exists only one bright point in an image, generation of hierarchical images based solely on $f^{(m,3)}$ related to a maxima point can be effective to a certain degree. In this case, no other submapping is necessary at the same level, thus the amount of computation relative on s is effectively reduced.

(4) In the base technology, as the level of resolution of an image advances by one through a critical point filter, the number of pixels becomes ¼. However, it is possible to suppose that one block consists of 3×3 pixels and critical points are searched in this 3×3 block, then the number of pixels will be ⅑ as the level advances by one.

(5) In the base technology, if the source and the destination images are color images, they would generally first be converted to monochrome images, and the mappings then computed. The source color images may then be transformed by using the mappings thus obtained. However, as an alternate method, the submappings may be computed regarding each RGB component.

Preferred Embodiments for Multivariate Space Processing

A technique for multivariate space processing utilizing the above-described base technology will now be described. In the following, the term "variate" or "variable" is used to describe each of a plurality of variable quantities in a multivariate space. It is to be noted that a variate may also sometimes be called a parameter and these terms may generally be treated in the same manner as the term "dimension", as the case may be. Further, when a variate is referred to as a variate of an object, the variate may also be defined as an attribute of the object.

Figure 18:
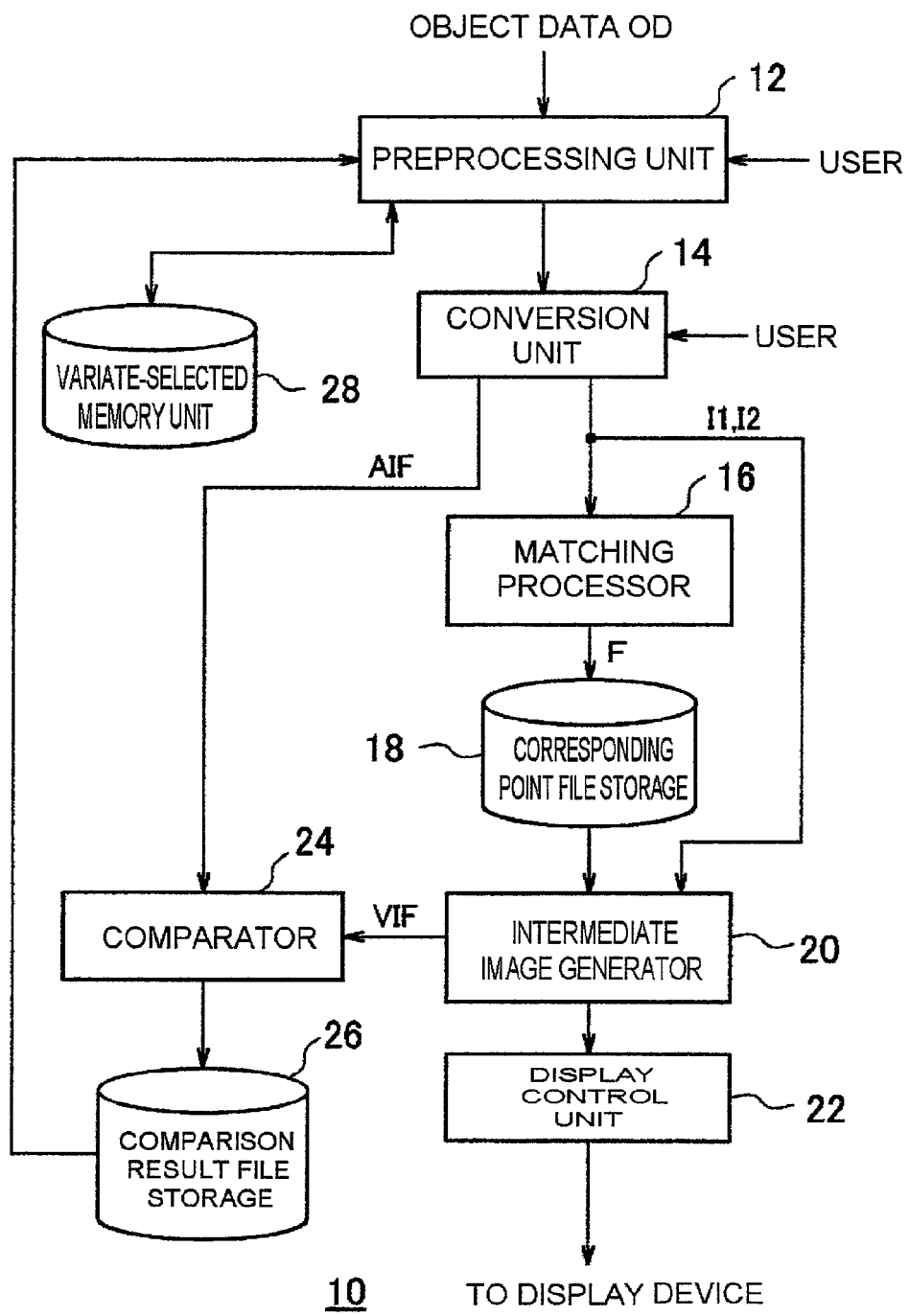
FIG. 18 shows a structure of a multivariate space processing apparatus according to an embodiment of the invention.

FIG. 18 shows a structure of a multivariate space processing apparatus 10 according to an embodiment of the invention. This apparatus includes: a preprocessing unit 12 which acquires multivariate data, which in a particular case is object data (OD), and degenerates the object data into three variates; a conversion unit 14 which receives the degenerated data and then generates a first image and a second image from the degenerated data; a matching processor 16 which performs a matching computation on the first image I1 and the second image I2; a corresponding point file storage unit 18 which stores a corresponding point file F obtained as a result of the matching computation; an intermediate image generator 20 which generates an intermediate image based on the first image I1, second image I2 and corresponding point file F; and a display control unit 22 which performs any processing necessary for displaying the intermediate image thus generated. The conversion unit 14 also generates an authentic intermediate image AIF at a predetermined point between the first image I1 and the second image I2, and outputs this authentic intermediate image AIF to a comparator 24. The intermediate image generator 20 also outputs a virtual intermediate image VIF generated from the first image I1 and the second image I2 to the comparator 24. The comparator 24 compares these two intermediate images, and stores a comparison result in a comparison result file storage unit 26.

Preferably, the preprocessing unit 12 also stores the three variates selected by a user in a variate-selected memory unit 28 for use in subsequent processing. Moreover, the preprocessing unit 12 also preferably has access to comparison results for previous data by referring to the comparison result file storage unit 26. In this way, the preprocessing unit 12 can display to a user previously selected variates and an indication of which previously selected variates provided a good comparison result. The user can utilize this information to aid in selection of the three variates to be used for the current process.

Figure 19:
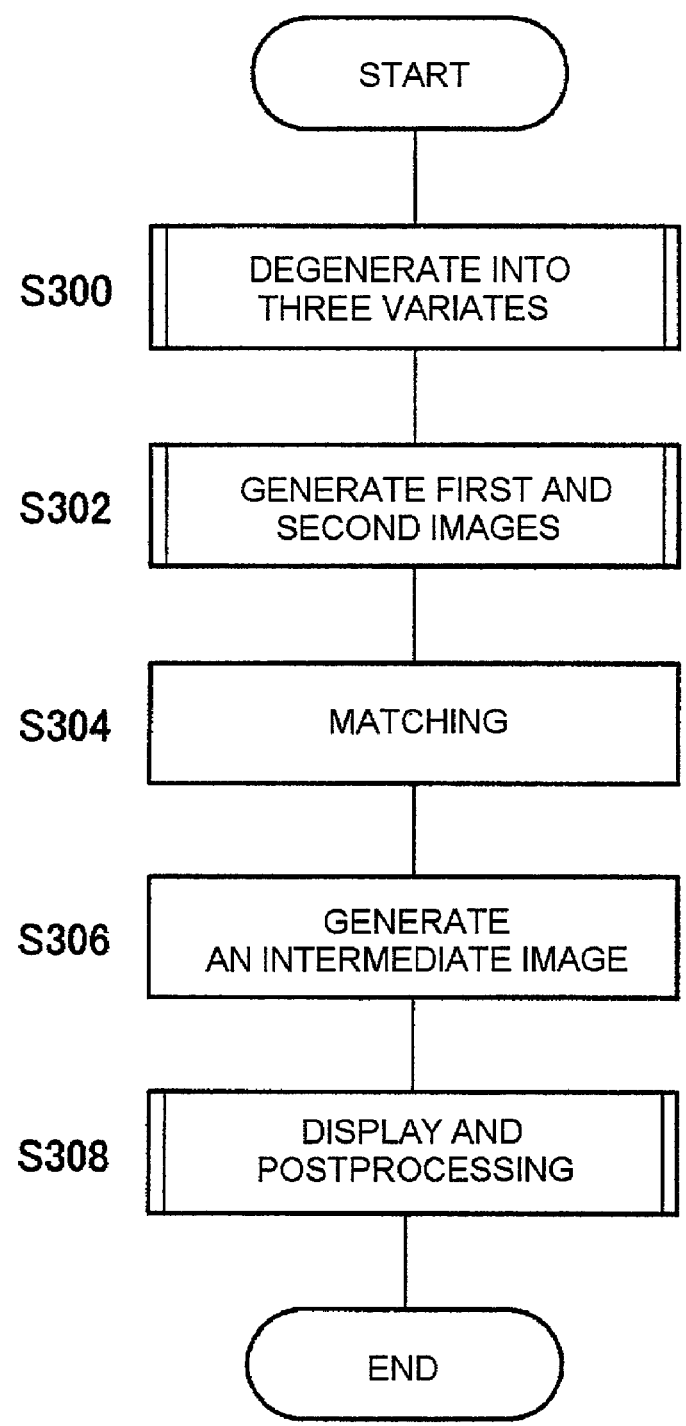
FIG. 19 is a flowchart showing a multivariate space processing method according to an embodiment of the invention.

FIG. 19 is a flowchart showing an overview of the processing in the multivariate space processing apparatus 10. The object data OD are first input to the preprocessing unit 12 where the input object data OD are degenerated into three variates (S300). Preferably, the preprocessing unit 12 displays previously selected variates and some indication of the order of approximation between the authentic intermediate images AIF and the virtual intermediate images VIF for the previously selected variates, as described above. This may assist the user in selecting a certain variate or variates to be targeted in the visualization. This information is particularly effective in a case where there are many variates of the same or similar level of importance.

Moreover, the preprocessing unit 12 preferably displays to the user previously selected variates for each type of object data OD. Thereby, the variates that the user was interested in in the past or the variates that the user chose for a predetermined purpose can be provided to the user to allow easier and more efficient selection of variates by the user.

Degeneration by the preprocessing unit 12 can be realized by various methods. As a simple example, the three variates the user selected, as they are, are selected and the remaining variates are ignored. As another method, in the course of reducing the variates, a conversion process can be performed on one or more remaining variates at an arbitrary timing. In a case where such a conversion is performed, the converted variates may also be stored in the variate-selected memory unit 28.

Similar to a case where the degeneration method involves a certain dimension being simply cut off, an alternative may be to assign a specific value for that dimension. For example, in a case where a three-dimensional space is degenerated into a two-dimensional space, the height may be set to some constant. Here, it suffices that the degeneration is such that n dimensions are degenerated (reduced) to a dimension number which is less than n. For example, a three-dimensional space may be converted to an arbitrary plane $ax+by+cz+d=0$ or the three-dimensional space may be converted to a curved surface such as $ax^2+by+c=0$. In any event, reducing the number of variates is called degeneration.

After the object data OD have been degenerated into three variates, the degenerated data are input to the conversion unit 14. The conversion unit 14 then waits for the user to input which variate is to be regarded as a reference among the three variates. The determination of which variate is to be used as a reference may also be set as a default or the like. Once a variate which will serve as the reference (simply referred to as a reference variate hereinafter) is specified, the conversion unit 14 generates the first image I1 and the second image I2 by setting two predetermined values to this reference variate (S302). Again, the predetermined values may be set by the user, may be default values, or may be otherwise determined.

As an example, the reference variate may be time t and the remaining two variates may be x and y spatial co-ordinates. By examining these variates, a first image at time t=t1 and a second image at time t=t2 can be defined. If an image matching is computed between these two images, an approximate behavior of the two variates x and y in the interval t=[t1, t2] can be determined. Thus, it suffices to compute a matching between the two-dimensional images and the computational load can be reduced by selecting a suitable algorithm. The "base technology" provides a suitable algorithm and contributes to producing a suitable visualization.

The first image I1 and the second image I2 thus generated are output to the matching processor 16. The matching processor 16 performs a matching computation where, for example, the computation may focus on critical points, as described in the base technology (S304). The corresponding point file F generated as a result of the matching computation is stored in the corresponding point file storage unit 18.

The intermediate image generator 20 receives the first image I1, the second image I2, and the corresponding point file F and generates a virtual intermediate image VIF by performing an interpolation computation based thereon. An example of a possible interpolation computation is described in more detail in the base technology. The intermediate image thus generated is output to the display control unit 22. The display control until performs any necessary processing of the intermediate image and the processed intermediate image is output to a display device (5308). The virtual intermediate image VIF thus generated is also output to the comparator 24 S308).

Figure 20:
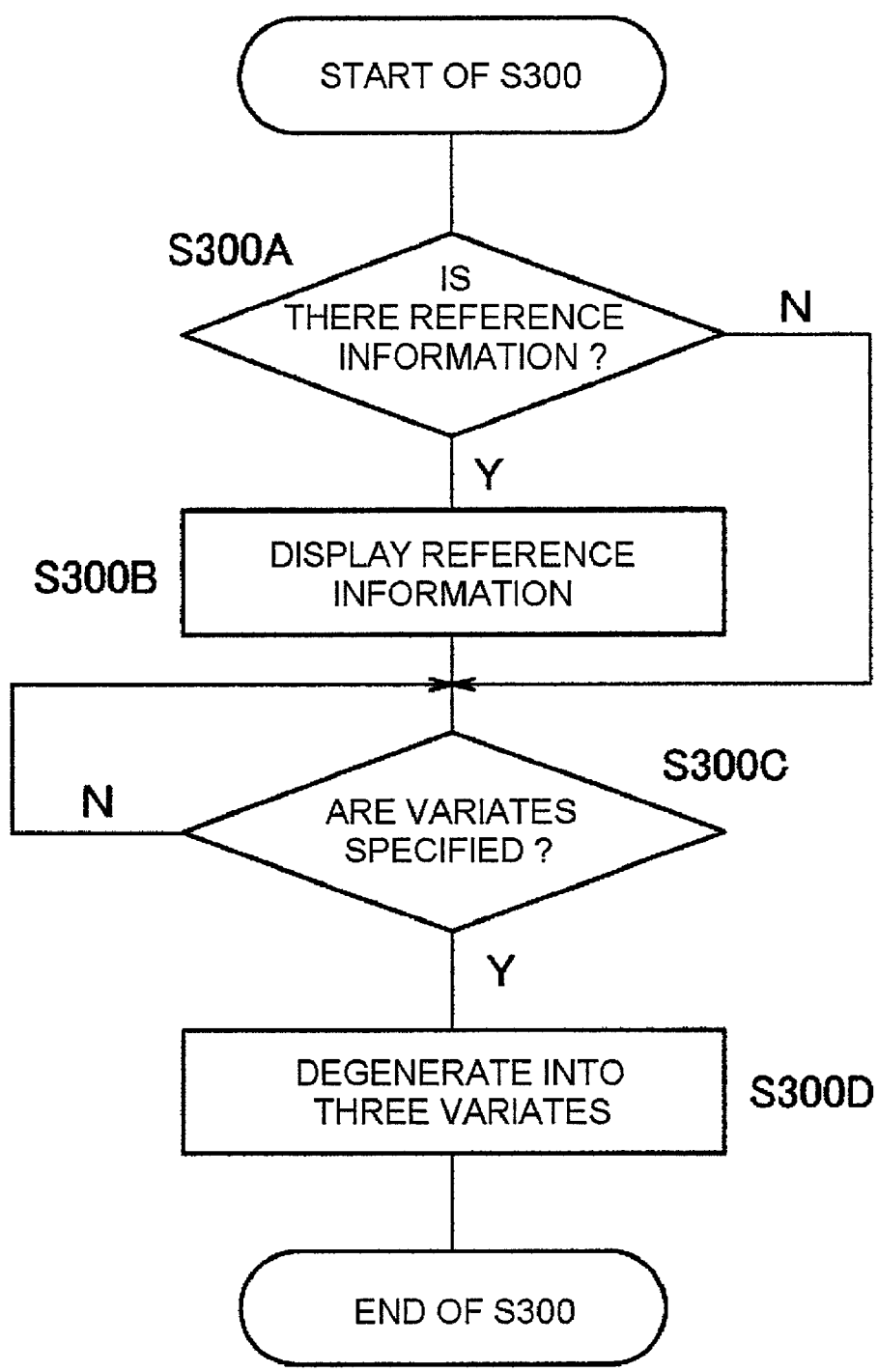
FIG. 20 shows more detail of S300 shown in FIG. 19.

FIG. 20 shows more detail of S300 shown in FIG. 19. The preprocessing unit 12 first refers to the comparison result file storage unit 26 and the variate-selected memory unit 28 to determine whether or not reference information exits (S300A). Here, "reference information" is used as a generic term for previous comparison results and previously selected variates. If any reference information exists (Y in S300A), it is displayed (S300B) whereas, if reference information does not exist (N in S300A), the display of the reference information (S300B)is skipped and the process waits for the user to specify selected variates (S300C).

After the user selects three variates by either confirming the displayed reference information or by specifying new variates (Y in S300C), the preprocessing unit 12 degenerates the object data OD into the selected three variates.

We now consider a stock price as an example of how a complicated multivariate object can be converted into a simple model by selecting three variates. As will be understood, there are generally a very large number of parameters that go into determining a stock price. Initially, three variates are tentatively selected based on a rule of thumb or an arbitrary selection after a search algorithm which has enumerated a number of possible variates. Next, a first image and a second image are generated and a virtual intermediate image thereof is generated by matching and interpolation. Thereafter, this virtual intermediate image and the actual stock price (which represents the authentic intermediate image) are compared to determine the suitability of the selection of the three variates. Thus, if the virtual intermediate image is close to the authentic intermediate image, it is concluded that the three variates have high importance. This can be used or further tested by determining if it is possible to analyze or predict the stock price at another time by using these three variates. If the virtual intermediate image and the authentic intermediate image are not close or if further testing is needed, the virtual intermediate image and the authentic intermediate image may continue to be compared while the three variates are being changed, the selection of the reference variate is being changed and/or the value(s) set for the reference variate is/are being changed.

Figure 21:
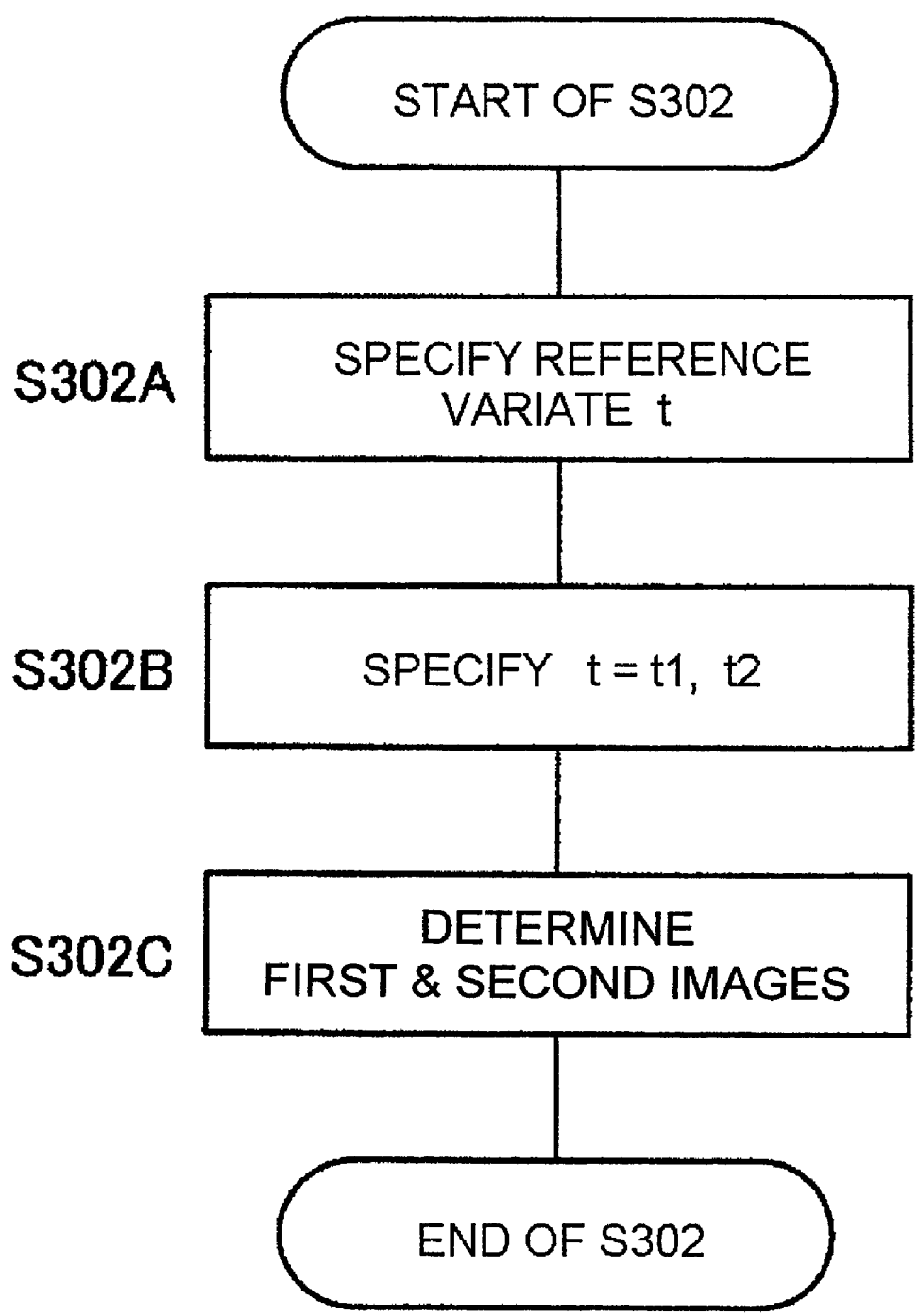
FIG. 21 shows more detail of S302 shown in FIG. 19.

FIG. 21 shows more detail of S302 shown in FIG. 19. The conversion unit 14, which has received the three variates, first inquires of the user as to which variate is to be regarded as the reference variate (denoted as t hereinafter)(S302A). After the user specifies the reference variate at S302A, the conversion unit 14 requests two specific values of the reference variate t from the user (S302B). These two values are necessary for generating the first image I1 and the second image I2. As noted above, the two values may alternatively be predetermined or calculated values. After the conversion unit 14 acquires the user specified two values t=t1 and t=t2 at S302B, the conversion unit 14 determines the first image I1 and second image I2 (S302C). Since values of the remaining two variates may be determined by substituting specific values into the reference variate t, the first image I1 and the second image I2 represented by these two variates can be determined efficiently.

The processes performed by the matching processor 16 at S304 of FIG. 19 and the intermediate image generator 20 at S306 of FIG. 19 are generally as described in the base technology above.

Figure 22:
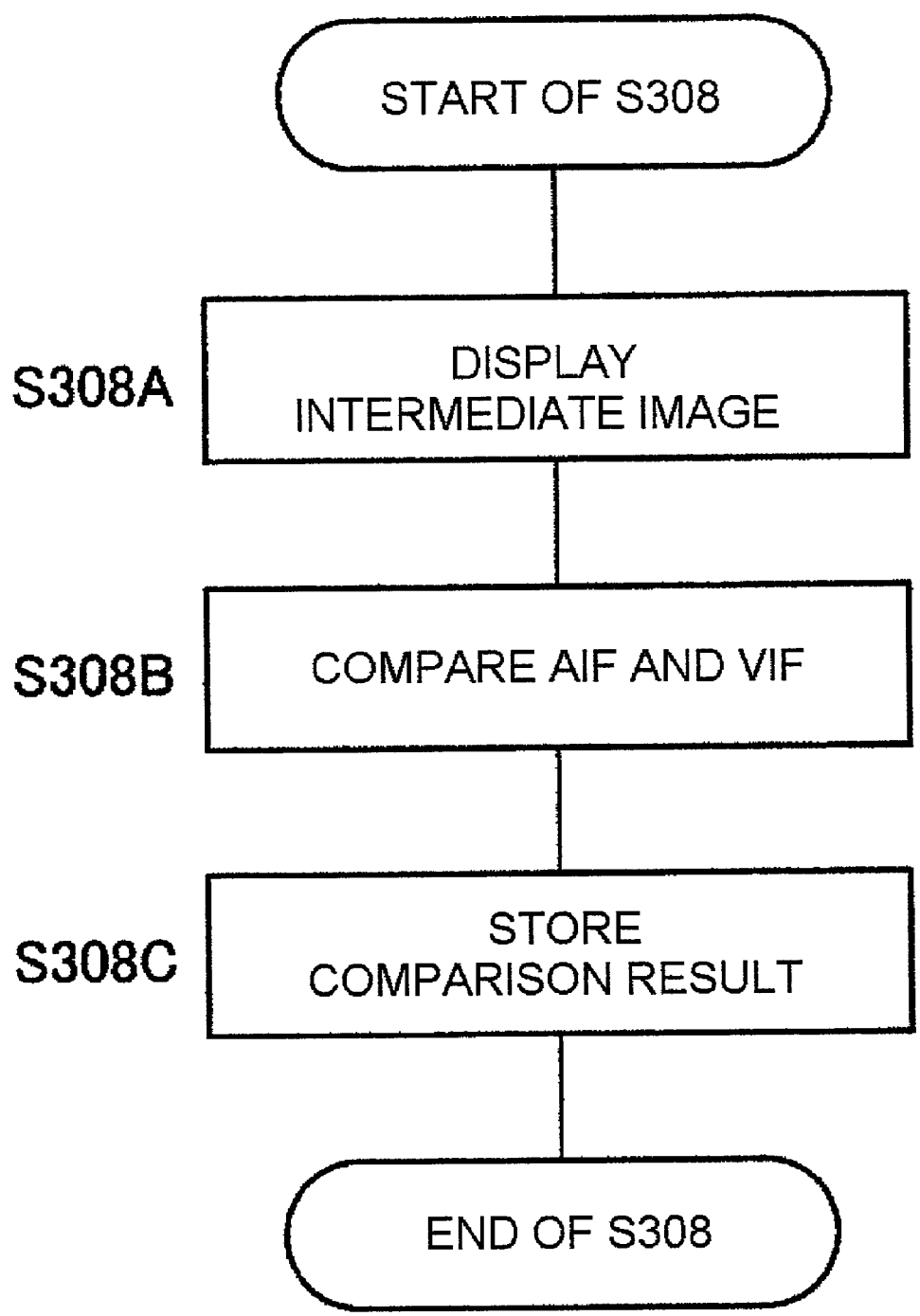
FIG. 22 shows more detail of S308 shown in FIG. 19.

FIG. 22 shows more detail of S308 shown in FIG. 19. After the intermediate image has been generated by the intermediate image generator 20 (S306 of FIG. 19), the display control unit 22 requires this intermediate image and may also receive the first image I1 and second image I2 depending on the application. The display control unit 22 then converts the intermediate image into a data format which can be displayed on the display unit (S308A). Thereby, a two-dimensional image is realized for visualization.

The intermediate image is also sent to the comparator 24 by the intermediate image generator 20 as a virtual intermediate image VIF and the comparator 24 compares the authentic intermediate image AIF and the virtual intermediate image VIF (S308B). For example, the comparator 24 may compare the authentic intermediate image AIF and virtual intermediate image VIF at a midpoint $t=(t1+t2)/2$ of t=t1 and t=t2. In this case the conversion unit 14 may be arranged to substitute $t=(t1+t2)/2$ as the reference variate and determine the remaining two variates at that value so that a two-dimensional image can be generated. This image is generated based on the actual data and is, in this sense, an authentic intermediate image. Similarly, the intermediate image generator 20 may use the same reference variate value $t=(t1+t2)/2$ so that a virtual intermediate image at that reference variate value is generated through an interpolation computation.

The comparator 24 takes a difference of the authentic intermediate image AIF and the virtual intermediate image and determines whether the result is desirable or not according to an amount of the difference. The comparison result is stored in the comparison result file storage unit 26 (S308C). Alternatively, the comparator 24 may simply compute the difference and may store this computed difference in the comparison result file storage unit 26. In this case, the preprocessing unit 12 may determine whether or not the comparison result is desirable.

Figure 23:
FIG. 23 shows an image based on data for a tornado at time t=t1.
Figure 24:
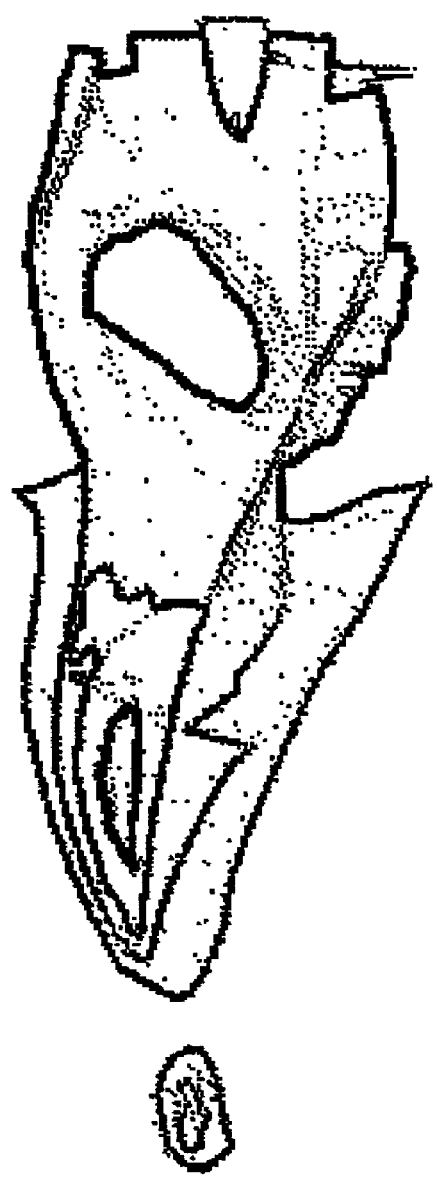
FIG. 24 shows an image based on data for a tornado at time t=t2.
Figure 25:
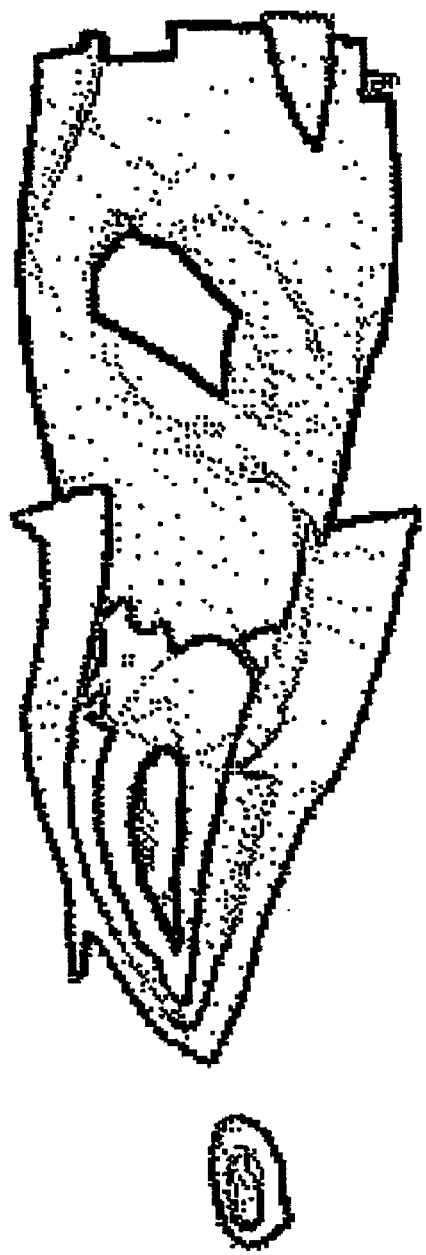
FIG. 25 shows an intermediate image obtained based on the images of FIGS. 23 and 24.

FIGS. 23, 24 and 25 show experimental visualization results according to the present embodiment. Here, data on atmospheric pressure in the vicinity of the center of a tornado are considered as the object data. FIG. 23 and FIG. 24 show distributions of atmospheric pressure viewed from a transverse direction at predetermined times t=t1 and t=t2, respectively. Thus, FIG. 23 may be considered the first image I1 and FIG. 24 may be considered the second image I2 described above. FIG. 25 shows a virtual intermediate image at t=(t1+t2)/2 between the first image I1 and the second image I2. Now, suppose that the z axis is placed in the longitudinal direction of the tornado, then the first image I1 and the second image I2, shown in FIG. 23 and FIG. 24, respectively, can be thought of as three-variate made up of (1) two dimensional information acquired when the object data are projected on a plane parallel to the z axis and (2) the time. Thus, the processing of the preprocessing unit 12 in this example is one in which the object data are projected on a plane parallel to the z axis and the time parameters are stored.

Further, the processing of the conversion unit 14 can be considered as selecting time t as the reference variate and obtaining two dimensional images at the times t1 and t2. As can be seen from the result shown in FIG. 25, visualization results can be obtained efficiently by utilizing a simplified method according to the present embodiment.

In other words, the method and apparatus for multivariate space processing according to the above embodiment are implemented in the tornado example such that (1) the first image and the second image are acquired by projecting three-dimensional data of an object on a predetermined x-y plane and (2) a matching between the first image and the second image thus acquired is computed so that intermediate states in the range of time t=[t1, t2] can be visualized by interpolating the two-dimensional images at time t=t1 and time t=t2. Computationally, once the matching is completed, there will not be much time needed for the interpolation. Moreover, since the interpolation can be performed at any point by arbitrarily varying the time t, the computational load becomes extremely low compared to the conventional visualization where a three-dimensional computation is performed sequentially. Thus, the present embodiment is effective particularly when one wants to quickly visualize the result showing a simulation in as simplified and convenient a manner as possible.

As is seen in the tornado example, there is an implicit relationship between degeneration and projection of object data. That is, when reducing or degenerating the parameters of a multidimensional phenomenon or object, the object may be "viewed" from various "angles", an inspection may be carried out to determine an angle at which a most characteristic image is obtained, and the degeneration to view the object at that particular angle may be repeated. Using a simple example, consider a case where a three-dimensional object is projected as a "shadow picture" on a plane. For most three-dimensional objects, there will be an angle at which the original object can be relatively easily grasped from the shadow picture. A projection operation using this angle corresponds to the degeneration.

Though the present invention has been described based on the above embodiments, the present invention is not limited to these specific embodiments alone and various modifications thereto are also effective as encompassed by the present invention. Some of such the modifications will be described here.

In the present embodiment, the tornado example was used to illustrate a phenomenon in three-dimensional space with the added dimension of time. However, the present invention is not limited to three or four dimensions and can also be applied to handle multivariate phenomena or objects. For example, in analyzing a complex economic phenomenon, a similar visualization process can be performed in a simple manner by initially specifying three variates that the user should pay attention to among various parameters. Then, by varying selection of the three variates, it is possible to determine which particular variates have a higher degree of importance in the economic phenomenon. Moreover, based on the comparison results of the comparator 24, the variate or variates which are important in the economic phenomenon can be more easily determined on a case-by-case basis.

In other words, by implementing the multivariate space processing method according to the present invention, it is possible to avoid the complex modeling which is generally required in conventional simulation and analysis of complicated multivariate objects or phenomena, and visualization can be realized using a simple and convenient method. Thus, one of the main advantages of the embodiments of the invention lies in the proposition and realization of this new methodology by which arbitrary phenomena can be understood by a process of relatively simple matching of two-dimensional images and without modeling.

Although the present invention has been described by way of exemplary embodiments, it should be understood that many changes and substitutions may be made by those skilled in the art without departing from the spirit and the scope of the present invention which is defined by the appended claims.

What is claimed is:

1. A multivariate space processing method, comprising:
   degenerating multivariate data into three predetermined variates;
   determining a reference variate to serve as a reference among the three variates;
   acquiring a first two-dimensional space formed by the remaining two variates when the reference variate takes a first value;
   acquiring a second two-dimensional space formed by the remaining two variates when the reference variate takes a second value;
   computing a matching between the first two-dimensional space and the second two-dimensional space;
   generating a virtual intermediate two-dimensional space based on the first two-dimensional space and the second two-dimensional space by performing an interpolation computation based on a result of said matching computation; and
   comparing the virtual intermediate two-dimensional space obtained from the matching computation and an authentic intermediate two-dimensional space obtained based on a predetermined value of the multivariate data.

2. A method according to claim 1, wherein the first and second two-dimensional spaces are regarded as a first image and a second image, respectively, and the matching is computed pixel by pixel based on correspondence between a critical point detected through a two-dimensional search on the first image and a critical point detected through a two-dimensional search on the second image.

3. A method according to claim 2, further comprising:
multiresolutionalizing the first image and the second image by respectively extracting the critical points;
performing a pixel-by-pixel matching computation on the first image and the second image at the same multiresolution level; and
acquiring a pixel-by-pixel correspondence relation at a finer level of resolution while inheriting a result of the pixel-by-pixel matching computation from a matching computation at a different multiresolution level.

4. A method according to claim 1, further comprising: displaying the virtual intermediate two-dimensional space.

5. A method according to claim 1, wherein the virtual intermediate two-dimensional space and the authentic intermediate two-dimensional space are compared while changing the predetermined variates.

6. A method according to claim 1, wherein the virtual intermediate two-dimensional space and the authentic intermediate two-dimensional space are compared while changing the selection of the reference variate.

7. A method according to claim 1, wherein the virtual intermediate two-dimensional space and the authentic intermediate two-dimensional space are compared while changing the first value and the second value.

8. A method according to claim 1, wherein the virtual intermediate two-dimensional space and the authentic intermediate two-dimensional space are compared after a predetermined conversion is performed on the first and second two-dimensional spaces.

9. A computer readable medium containing computer executable code, such that when the code is executed by a computer, the code causes the computer to perform the functions of:
degenerating multivariate data into three predetermined variates;
determining a reference variate to serve as a reference among the three variates;
acquiring a first two-dimensional space formed by the remaining two variates when the reference variate takes a first value;
acquiring a second two-dimensional space formed by the remaining two variates when the reference variate takes a second value;
computing a matching between the first two-dimensional space and the second two-dimensional space;
generating a virtual intermediate two-dimensional space based on the first two-dimensional space and the second two-dimensional space by performing an interpolation computation based on a result of said matching computation; and
comparing the virtual intermediate two-dimensional space and an authentic intermediate two-dimensional space obtained based on a predetermined value of the multivariate data.

* * * * *